US012597149B2

(12) United States Patent
Grona et al.

(10) Patent No.: US 12,597,149 B2
(45) Date of Patent: Apr. 7, 2026

(54) APPARATUS, METHOD, AND COMPUTER PROGRAM FOR NETWORK COMMUNICATIONS

(71) Applicant: VELOX XR LIMITED, London (GB)

(72) Inventors: Oleksandr Grona, Woking (GB); Vladyslav Merdov, Kyiv (UA)

(73) Assignee: VELOX XR LIMITED (GB)

( * ) Notice: Subject to any disclaimer, the term of this patent is extended or adjusted under 35 U.S.C. 154(b) by 209 days.

(21) Appl. No.: 18/384,696

(22) Filed: Oct. 27, 2023

(65) Prior Publication Data

US 2024/0144501 A1     May 2, 2024

(30) Foreign Application Priority Data

Oct. 28, 2022     (GB) ...................................... 2216004

(51) Int. Cl.
*G06T 7/50*          (2017.01)
*G06T 9/00*          (2006.01)
(Continued)

(52) U.S. Cl.
CPC ................... *G06T 7/50* (2017.01); *G06T 9/00* (2013.01); *G06T 15/06* (2013.01); *G06T 19/20* (2013.01);
(Continued)

(58) Field of Classification Search
None
See application file for complete search history.

(56) References Cited

U.S. PATENT DOCUMENTS 6,377,257 B1     4/2002  Borrel
10,552,970 B2 *  2/2020  Huang .................... G06T 7/136
(Continued)

FOREIGN PATENT DOCUMENTS

EP        3185214       6/2017
KR        101843081     3/2018
(Continued)

OTHER PUBLICATIONS

Shi et al.,A Real-Time Remote Rendering System for Interactive Mobile Graphics, ACM Trans. Multimedia Comput. Commun. Appl. 8, 3s, Article 46 (Sep. 2012), 20 pages (Year: 2012).*
Sonoda, et al.; Article entitled: "Depth image compression by colorization for Intel® RealSense TM Depth Cameras", Apr. 23, 2020, retrieved from the internet: URL: https://dev.intelrealsense.com/docs/de pth-image-compression-by-colorization-fo••intel-realsense-depth-cameras [retrieved on Mar. 1, 2024]. 15 pgs.
(Continued)

*Primary Examiner* — Kee M Tung
*Assistant Examiner* — Biao Chen
(74) *Attorney, Agent, or Firm* — Taylor Duma LLP

(57)          ABSTRACT
There is provided an apparatus comprising means for: receiving, from a device, at least one parameter associated with the device, wherein the at least one parameter is for an environment viewable by the device, and generating a depth map associated with the environment, wherein the depth map comprises a plurality of pixels. The apparatus comprising means for, for each a pixel of the depth map: determining a depth value for the pixel using: i) the at least one parameter, and ii) at least one geometry library comprising geometry information about the environment, and storing the determined depth value of the pixel in the depth map. The apparatus comprising means for providing, to the device via a network, information related to the depth map comprising the determined depth values.

19 Claims, 10 Drawing Sheets

---

Receiving, from a device, at least one parameter associated with the device, wherein the at least one parameter is for an environment viewable by the device          S601

Generating a depth map associated with the environment, wherein the depth map comprises a plurality of pixels          S603

For a pixel of the depth map:
     determining a depth value for the pixel using: i) the at least one parameter, and ii) at least one geometry library comprising geometry information about the environment;
     storing the determined depth value of the pixel in the depth map          S605

Providing, to the device via a network, information related to the depth map comprising the determined depth value          S607

(51) Int. Cl.
  G06T 15/06 (2011.01)
  G06T 19/20 (2011.01)
(52) U.S. Cl.
  CPC .......................... *G06T 2207/10024* (2013.01);
      *G06T 2210/32* (2013.01); *G06T 2219/2012*
      (2013.01)

(56) References Cited

U.S. PATENT DOCUMENTS

2017/0178351 A1\* 6/2017 Kerbiriou ................. G06T 5/77
2023/0230311 A1\* 7/2023 Xie ......................... G06T 17/20
                                                      345/426

FOREIGN PATENT DOCUMENTS

WO        2021108850        6/2021

WO        2022063260        3/2022

OTHER PUBLICATIONS

Velox RX Limited; Extended European Search Report for application No. 23206461.8, mailed Mar. 14, 2024, 9 pgs.
ACM Transactions on Multimedia Computing, Communications and Applications, vol. 8, No. 3s, Article 46, Publication date: Sep. 2012, Shu Shi, Klara Nahrstedt, and Roy Campbell, "A Real-Time Remote Rendering System for Interactive Mobile Graphics", 21 pgs.
Grona, Oleksandr; Search Report for United Kingdom patent application No. GB2216004.8, mailed Apr. 28, 2023, 4 pgs.
PCM 2002, LNCS 2532, pp. 1105-1111 11, 2002, Y.-C. Chen, L.-W. Chang, and C.-T. Hsu (Eds.) "Enhancing 3D Graphics on Mobile Devices by Image-Based Rendering", 8 pgs.

\* cited by examiner

Figure 6

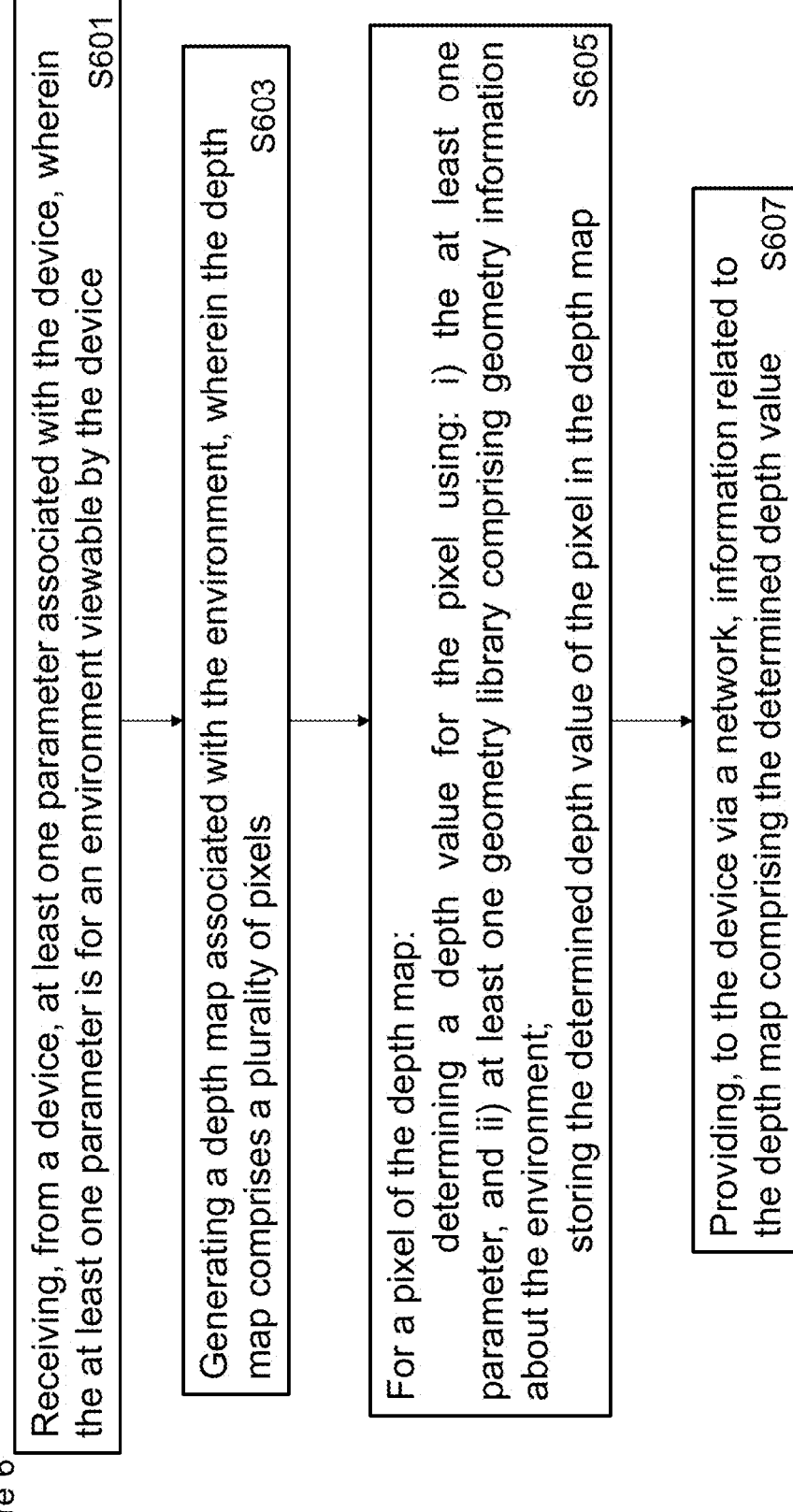

Receiving, from a device, at least one parameter associated with the device, wherein the at least one parameter is for an environment viewable by the device          S601

Generating a depth map associated with the environment, wherein the depth map comprises a plurality of pixels          S603

For a pixel of the depth map:
    determining a depth value for the pixel using: i) the at least one parameter, and ii) at least one geometry library comprising geometry information about the environment;
    storing the determined depth value of the pixel in the depth map          S605

Providing, to the device via a network, information related to the depth map comprising the determined depth value          S607

Figure 7

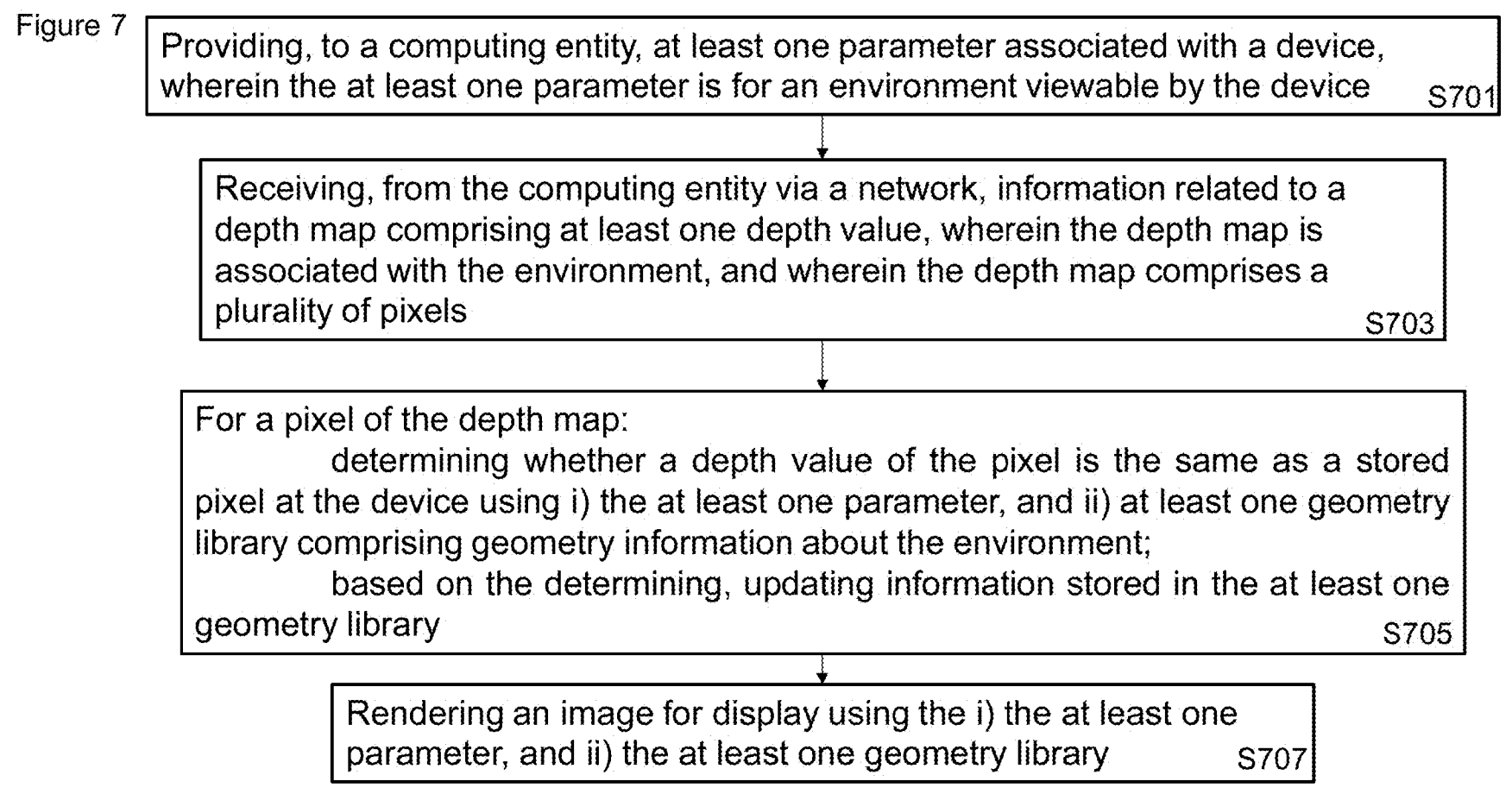

Providing, to a computing entity, at least one parameter associated with a device, wherein the at least one parameter is for an environment viewable by the device    S701

Receiving, from the computing entity via a network, information related to a depth map comprising at least one depth value, wherein the depth map is associated with the environment, and wherein the depth map comprises a plurality of pixels    S703

For a pixel of the depth map:
    determining whether a depth value of the pixel is the same as a stored pixel at the device using i) the at least one parameter, and ii) at least one geometry library comprising geometry information about the environment;
    based on the determining, updating information stored in the at least one geometry library    S705

Rendering an image for display using the i) the at least one parameter, and ii) the at least one geometry library    S707

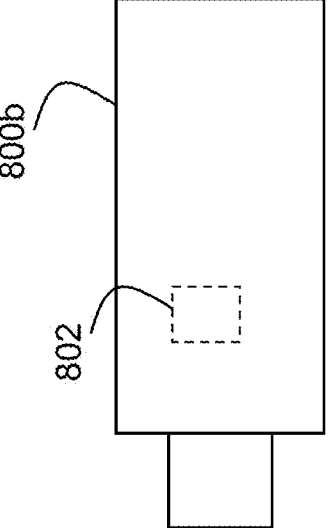
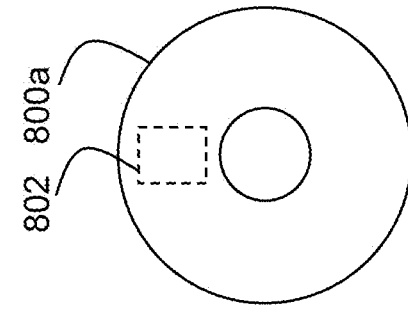
Figure 8

APPARATUS, METHOD, AND COMPUTER PROGRAM FOR NETWORK COMMUNICATIONS

CROSS-REFERENCE TO RELATED APPLICATIONS

This application claims the benefit of United Kingdom Application no. GB2216004.8 filed Oct. 28, 2022, and entitled "Apparatus, method, and computer program for network communications", which is incorporated by reference herein in its entirety.

FIELD

The present application relates to a method, apparatus, and computer program for network communications.

BACKGROUND

A system for communications may enable communication sessions between a plurality of different entities such as, for example, between mobile devices, user equipments, servers, base stations, and other communications nodes. The entities of the system may be connected wirelessly to one another, or through wired connections, or both. Wired connections may offer additional security to users, in addition to the capacity to move data in a quick manner. Wireless connections may have advantages including improved mobility, while being more cost efficient.

Communication sessions allow entities to send data to, and receive data from, other entities in the system, such as voice data, text data, image data, video data, and so on. Communication sessions may be one-to-many, whereby a single entity provides data to a plurality of other entities. Some other communication sessions may be many-to-one, whereby a plurality of entities provide data to another single entity.

Some non-limiting examples of network services provided by communications systems include data communications, calls, and access to a data network systems like the Internet.

SUMMARY

According to an aspect, there is provided an apparatus comprising means for: receiving, from a device, at least one parameter associated with the device, wherein the at least one parameter is for an environment viewable by the device; generating a depth map associated with the environment, wherein the depth map comprises a plurality of pixels; for a pixel of the depth map: determining a depth value for the pixel using: i) the at least one parameter, and ii) at least one geometry library comprising geometry information about the environment; storing the determined depth value of the pixel in the depth map; and providing, to the device via a network, information related to the depth map comprising the determined depth value.

In an example, the at least one geometry library is of the apparatus.

In an example, the environment is one of: a virtual environment, and a scanned real environment.

In an example, the depth map is i) an image, or ii) an image channel, that comprises information relating to the distance of the surfaces of objects in the environment from a viewpoint.

In an example, the depth value is a distance between i) a surface in the environment, and ii) a viewpoint, for the respective pixel.

In an example, the means for generating a depth map comprises: means for generating the depth map for a frame, wherein the frame is based on the received at least one parameter.

In an example, the frame is an image frame, or a video frame.

In an example, the apparatus comprises means for: for each pixel of the depth map: determining a depth value for the pixel using: i) the at least one parameter, and ii) at least one geometry library comprising geometry information about the environment; storing the determined depth value of the pixel in the depth map.

In an example, the means for providing, to the device via a network, information related to the depth map comprising the determined depth value comprises: means for providing, to the device via a network, the depth map comprising the determined depth value.

In an example, the means for determining a depth value for the pixel comprises means for: determining a relevant section of the environment based on the at least one parameter; retrieving geometry information from the geometry library for the relevant section of the environment; and calculating a depth value for the pixel using the geometry information.

In an example, the means for calculating a depth value comprises means for: performing a ray-tracing operation for the pixel using the geometry information to determine the depth value.

In an example, the means for generating the depth map comprises: means for generating the depth map for the frame using the at least one parameter, and wherein the depth map is initially empty after generation.

In examples, the providing, to the device, the depth map comprising the determined depth values is performed in response to storing a determined depth value for each and every pixel of the frame in the depth map.

In an example, the means for, for each pixel of the frame, determining a depth value for the pixel comprises means for: determining whether the same determined depth value, for the pixel, has been previously provided to the device; the means for, for each pixel of the frame, storing the determined depth value of the pixel comprising means for: when it is determined that the same determined depth value has not been previously provided, storing the determined depth value of the pixel in the depth map; and when it is determined that the same determined depth value has been previously provided, leaving the depth value for the pixel empty in the depth map.

In an example, a depth value to be stored in the depth map indicating a black colour indicates that the depth value is invalid, and wherein a depth value to be stored in the depth map indicating a white colour indicates that the depth value has not been updated when compared to a previous depth map.

In an example, the apparatus comprises means for: receiving, from a device, at least one further parameter associated with the device, wherein the at least one further parameter is for the environment; generating a further depth map associated with the environment, wherein the further depth map comprises a plurality of pixels; for a pixel of the further depth map: determining a further depth value for the pixel using: i) the at least one parameter, and ii) the at least one geometry library; comparing the further depth value for the pixel of the further depth map, to the depth value of the pixel of the depth map; when it is determined that the depth values are different, storing the further depth value of the pixel in the further depth map; and providing, to the device via a network, information related to the further depth map.

In an example, a depth value to be stored in the further depth map indicating a black colour indicates that the depth value is invalid, and wherein a depth value to be stored in the further depth map indicating a white colour indicates that the depth value has not been updated when compared to the depth map.

In an example, the apparatus comprises means for: before the providing to the device via the network, colourising each pixel of the depth map to convert grayscale to colour data; in response to the colourising, performing a data compression of the depth map.

In an example, the apparatus comprises means for: providing a near depth threshold value and a far depth threshold value; for each pixel of the frame, updating at least one of: i) the near depth threshold value, and ii) the far threshold value, using the determined depth value for the pixel; and providing the near and far depth threshold values to the device as metadata for the depth map.

In an example, the at least one parameter comprises at least one of: a resolution associated with the device, a camera view associated with the device, and a timecode associated with the device.

In an example, the at least one parameter comprises the resolution associated with the device, the generated depth map for the frame is the same size as the resolution associated with the device.

In an example, the means for receiving comprises means for: receiving, from a plurality of devices, a plurality of parameters, each of the devices having an associated at least one parameter.

In an example, the geometry library stores three-dimensional geometry of the environment.

In an example, one of: the apparatus is for a computing entity, the apparatus is comprised in the computing entity, and the apparatus is the computing entity.

In an example, the computing entity is a server, a processing device, a network entity.

According to an aspect, there is provided an apparatus comprising means for: providing, to a computing entity, at least one parameter associated with a device, wherein the at least one parameter is for an environment viewable by the device; receiving, from the computing entity via a network, information related to a depth map comprising at least one depth value, wherein the depth map is associated with the environment, and wherein the depth map comprises a plurality of pixels; for a pixel of the depth map: determining whether a depth value of the pixel is the same as a stored pixel at the device using i) the at least one parameter, and ii) at least one geometry library comprising geometry information about the environment; based on the determining, updating information stored in the at least one geometry library; and rendering an image for display using the i) the at least one parameter, and ii) the at least one geometry library.

In an example, the at least one geometry library is of the device.

In an example, the apparatus comprises means for: for each pixel: determining a depth value for the stored pixel using: i) the at least one parameter, and ii) the at least one geometry library of the device.

In an example, the means for determining the depth value comprises means for: performing a ray-tracing operation for the stored pixel using the geometry information to determine the depth value.

In an example, the means for rendering an image for display comprises means for: rendering the image as a three-dimensional representation using depth information stored in the at least one geometry library of the device.

In an example, the apparatus comprises means for: for each pixel of the depth map: determining whether a depth value of the pixel is the same as a stored pixel at the device using i) the at least one parameter, and ii) at least one geometry library comprising geometry information about the environment; and based on the determining, updating information stored in the at least one geometry library.

In an example, the apparatus comprises means for: for each pixel of the depth map: determining whether the depth value of the pixel indicates a black or a white colour; and based on the determining, i) looping to the next pixel when it is determined that the depth value indicates a white pixel, and ii) discarding geometry information associated with the pixel and looping to the next pixel when it is determined that the depth value indicates a black pixel, wherein, for the received depth map, an indicated white pixel indicates no update for that pixel, and an indicated black pixel indicates a non-valid depth.

In an example, the information related to the depth map comprises: a compressed depth map, wherein the data within the depth map comprises red, green, blue colour information.

In an example, the apparatus comprises means for: performing a data decompression of the received compressed depth map; and in response to the decompression, determining depth values of the depth map by converting colour data to grayscale data.

In an example, one of: the apparatus is for the device, the apparatus is comprised in the device, and the apparatus is the device.

In an example, the device is one of: a client computing device, a mobile device, a user equipment, a tablet computer, a personal computer.

According to an aspect, there is provided an apparatus comprising: at least one processor, and at least one memory storing instructions that, when executed by the one or more processors, cause the apparatus to perform: receiving, from a device, at least one parameter associated with the device, wherein the at least one parameter is for an environment viewable by the device; generating a depth map associated with the environment, wherein the depth map comprises a plurality of pixels; for a pixel of the depth map: determining a depth value for the pixel using: i) the at least one parameter, and ii) at least one geometry library comprising geometry information about the environment; storing the determined depth value of the pixel in the depth map; and providing, to the device via a network, information related to the depth map comprising the determined depth value.

In an example, the environment is one of: a virtual environment, and a scanned real environment.

In an example, the depth map is i) an image, or ii) an image channel, that comprises information relating to the distance of the surfaces of objects in the environment from a viewpoint.

In an example, the depth value is a distance between i) a surface in the environment, and ii) a viewpoint, for the respective pixel.

In an example, the generating a depth map comprises: generating the depth map for a frame, wherein the frame is based on the received at least one parameter.

In an example, the frame is an image frame, or a video frame.

In an example, the apparatus is caused to perform: for each pixel of the depth map: determining a depth value for the pixel using: i) the at least one parameter, and ii) at least one geometry library comprising geometry information about the environment; storing the determined depth value of the pixel in the depth map.

In an example, the providing, to the device via a network, information related to the depth map comprising the determined depth value comprises: providing, to the device via a network, the depth map comprising the determined depth value.

In an example, the determining a depth value for the pixel comprises: determining a relevant section of the environment based on the at least one parameter; retrieving geometry information from the geometry library for the relevant section of the environment; and calculating a depth value for the pixel using the geometry information.

In an example, the calculating a depth value comprises: performing a ray-tracing operation for the pixel using the geometry information to determine the depth value.

In an example, the generating the depth map comprises: generating the depth map for the frame using the at least one parameter, and wherein the depth map is initially empty after generation.

In examples, the providing, to the device, the depth map comprising the determined depth values is performed in response to storing a determined depth value for each and every pixel of the frame in the depth map.

In an example, for each pixel of the frame, determining a depth value for the pixel comprises: determining whether the same determined depth value, for the pixel, has been previously provided to the device; the, for each pixel of the frame, storing the determined depth value of the pixel comprising: when it is determined that the same determined depth value has not been previously provided, storing the determined depth value of the pixel in the depth map; and when it is determined that the same determined depth value has been previously provided, leaving the depth value for the pixel empty in the depth map.

In an example, a depth value to be stored in the depth map indicating a black colour indicates that the depth value is invalid, and wherein a depth value to be stored in the depth map indicating a white colour indicates that the depth value has not been updated when compared to a previous depth map.

In an example, the apparatus is caused to perform: receiving, from a device, at least one further parameter associated with the device, wherein the at least one further parameter is for the environment; generating a further depth map associated with the environment, wherein the further depth map comprises a plurality of pixels; for a pixel of the further depth map: determining a further depth value for the pixel using: i) the at least one parameter, and ii) the at least one geometry library; comparing the further depth value for the pixel of the further depth map, to the depth value of the pixel of the depth map; when it is determined that the depth values are different, storing the further depth value of the pixel in the further depth map; and providing, to the device via a network, information related to the further depth map.

In an example, a depth value to be stored in the further depth map indicating a black colour indicates that the depth value is invalid, and wherein a depth value to be stored in the further depth map indicating a white colour indicates that the depth value has not been updated when compared to the depth map.

In an example, the apparatus comprises means for: before the providing to the device via the network, colourising each pixel of the depth map to convert grayscale to colour data; in response to the colourising, performing a data compression of the depth map.

In an example, the apparatus is caused to perform: providing a near depth threshold value and a far depth threshold value; for each pixel of the frame, updating at least one of: i) the near depth threshold value, and ii) the far threshold value, using the determined depth value for the pixel; and providing the near and far depth threshold values to the device as metadata for the depth map.

In an example, the at least one parameter comprises at least one of: a resolution associated with the device, a camera view associated with the device, and a timecode associated with the device.

In an example, the at least one parameter comprises the resolution associated with the device, the generated depth map for the frame is the same size as the resolution associated with the device.

In an example, the receiving comprises: receiving, from a plurality of devices, a plurality of parameters, each of the devices having an associated at least one parameter.

In an example, the geometry library stores three-dimensional geometry of the environment.

In an example, one of: the apparatus is for a computing entity, the apparatus is comprised in the computing entity, and the apparatus is the computing entity.

In an example, the computing entity is a server, a processing device, a network entity.

According to an aspect, there is provided an apparatus comprising: at least one processor, and at least one memory storing instructions that, when executed by the one or more processors, cause the apparatus to perform: providing, to a computing entity, at least one parameter associated with a device, wherein the at least one parameter is for an environment viewable by the device; receiving, from the computing entity via a network, information related to a depth map comprising at least one depth value, wherein the depth map is associated with the environment, and wherein the depth map comprises a plurality of pixels; for a pixel of the depth map: determining whether a depth value of the pixel is the same as a stored pixel at the device using i) the at least one parameter, and ii) at least one geometry library comprising geometry information about the environment; based on the determining, updating information stored in the at least one geometry library; and rendering an image for display using the i) the at least one parameter, and ii) the at least one geometry library.

In an example, the at least one geometry library is of the device.

In an example, the apparatus is caused to perform: for each pixel: determining a depth value for the stored pixel using: i) the at least one parameter, and ii) the at least one geometry library of the device.

In an example, the determining the depth value comprises: performing a ray-tracing operation for the stored pixel using the geometry information to determine the depth value.

In an example, the rendering an image for display comprises: rendering the image as a three-dimensional representation using depth information stored in the at least one geometry library of the device.

In an example, the apparatus is caused to perform: for each pixel of the depth map: determining whether a depth value of the pixel is the same as a stored pixel at the device using i) the at least one parameter, and ii) at least one geometry library comprising geometry information about the environment; and based on the determining, updating information stored in the at least one geometry library.

In an example, the apparatus is caused to perform: for each pixel of the depth map: determining whether the depth value of the pixel indicates a black or a white colour; and based on the determining, i) looping to the next pixel when it is determined that the depth value indicates a white pixel, and ii) discarding geometry information associated with the pixel and looping to the next pixel when it is determined that the depth value indicates a black pixel, wherein, for the received depth map, an indicated white pixel indicates no update for that pixel, and an indicated black pixel indicates a non-valid depth.

In an example, the information related to the depth map comprises: a compressed depth map, wherein the data within the depth map comprises red, green, blue colour information.

In an example, the apparatus is caused to perform: performing a data decompression of the received compressed depth map; and in response to the decompression, determining depth values of the depth map by converting colour data to grayscale data.

In an example, one of: the apparatus is for the device, the apparatus is comprised in the device, and the apparatus is the device.

In an example, the device is one of: a client computing device, a mobile device, a user equipment, a tablet computer, a personal computer.

According to an aspect, there is provided a method comprising: receiving, from a device, at least one parameter associated with the device, wherein the at least one parameter is for an environment viewable by the device; generating a depth map associated with the environment, wherein the depth map comprises a plurality of pixels; for a pixel of the depth map: determining a depth value for the pixel using: i) the at least one parameter, and ii) at least one geometry library comprising geometry information about the environment; storing the determined depth value of the pixel in the depth map; and providing, to the device via a network, information related to the depth map comprising the determined depth value.

In an example, the environment is one of: a virtual environment, and a scanned real environment.

In an example, the depth map is i) an image, or ii) an image channel, that comprises information relating to the distance of the surfaces of objects in the environment from a viewpoint.

In an example, the depth value is a distance between i) a surface in the environment, and ii) a viewpoint, for the respective pixel.

In an example, the generating a depth map comprises: generating the depth map for a frame, wherein the frame is based on the received at least one parameter.

In an example, the frame is an image frame, or a video frame.

In an example, the method comprises: for each pixel of the depth map: determining a depth value for the pixel using: i) the at least one parameter, and ii) at least one geometry library comprising geometry information about the environment; storing the determined depth value of the pixel in the depth map.

In an example, the providing, to the device via a network, information related to the depth map comprising the determined depth value comprises: providing, to the device via a network, the depth map comprising the determined depth value.

In an example, the determining a depth value for the pixel comprises: determining a relevant section of the environment based on the at least one parameter; retrieving geometry information from the geometry library for the relevant section of the environment; and calculating a depth value for the pixel using the geometry information.

In an example, the calculating a depth value comprises: performing a ray-tracing operation for the pixel using the geometry information to determine the depth value.

In an example, the generating the depth map comprises: generating the depth map for the frame using the at least one parameter, and wherein the depth map is initially empty after generation.

In examples, the providing, to the device, the depth map comprising the determined depth values is performed in response to storing a determined depth value for each and every pixel of the frame in the depth map.

In an example, the, for each pixel of the frame, determining a depth value for the pixel comprises: determining whether the same determined depth value, for the pixel, has been previously provided to the device; the, for each pixel of the frame, storing the determined depth value of the pixel comprising: when it is determined that the same determined depth value has not been previously provided, storing the determined depth value of the pixel in the depth map; and when it is determined that the same determined depth value has been previously provided, leaving the depth value for the pixel empty in the depth map.

In an example, a depth value to be stored in the depth map indicating a black colour indicates that the depth value is invalid, and wherein a depth value to be stored in the depth map indicating a white colour indicates that the depth value has not been updated when compared to a previous depth map.

In an example, the method comprises: receiving, from a device, at least one further parameter associated with the device, wherein the at least one further parameter is for the environment; generating a further depth map associated with the environment, wherein the further depth map comprises a plurality of pixels; for a pixel of the further depth map: determining a further depth value for the pixel using: i) the at least one parameter, and ii) the at least one geometry library; comparing the further depth value for the pixel of the further depth map, to the depth value of the pixel of the depth map; when it is determined that the depth values are different, storing the further depth value of the pixel in the further depth map; and providing, to the device via a network, information related to the further depth map.

In an example, a depth value to be stored in the further depth map indicating a black colour indicates that the depth value is invalid, and wherein a depth value to be stored in the further depth map indicating a white colour indicates that the depth value has not been updated when compared to the depth map.

In an example, the apparatus comprises means for: before the providing to the device via the network, colourising each pixel of the depth map to convert grayscale to colour data; in response to the colourising, performing a data compression of the depth map.

In an example, the method comprises: providing a near depth threshold value and a far depth threshold value; for each pixel of the frame, updating at least one of: i) the near depth threshold value, and ii) the far threshold value, using the determined depth value for the pixel; and providing the near and far depth threshold values to the device as metadata for the depth map.

In an example, the at least one parameter comprises at least one of: a resolution associated with the device, a camera view associated with the device, and a timecode associated with the device.

In an example, the at least one parameter comprises the resolution associated with the device, the generated depth map for the frame is the same size as the resolution associated with the device.

In an example, the receiving comprises: receiving, from a plurality of devices, a plurality of parameters, each of the devices having an associated at least one parameter.

In an example, the geometry library stores three-dimensional geometry of the environment.

In an example, the method is performed by a computing entity.

In an example, the computing entity is a server, a processing device, a network entity.

According to an aspect, there is provided a method comprising: providing, to a computing entity, at least one parameter associated with a device, wherein the at least one parameter is for an environment viewable by the device; receiving, from the computing entity via a network, information related to a depth map comprising at least one depth value, wherein the depth map is associated with the environment, and wherein the depth map comprises a plurality of pixels; for a pixel of the depth map: determining whether a depth value of the pixel is the same as a stored pixel at the device using i) the at least one parameter, and ii) at least one geometry library comprising geometry information about the environment; based on the determining, updating information stored in the at least one geometry library; and rendering an image for display using the i) the at least one parameter, and ii) the at least one geometry library.

In an example, the at least one geometry library is of the device.

In an example, the method comprises: for each pixel: determining a depth value for the stored pixel using: i) the at least one parameter, and ii) the at least one geometry library of the device.

In an example, the determining the depth value comprises: performing a ray-tracing operation for the stored pixel using the geometry information to determine the depth value.

In an example, the rendering an image for display comprises: rendering the image as a three-dimensional representation using depth information stored in the at least one geometry library of the device.

In an example, the method comprises: for each pixel of the depth map: determining whether a depth value of the pixel is the same as a stored pixel at the device using i) the at least one parameter, and ii) at least one geometry library comprising geometry information about the environment; and based on the determining, updating information stored in the at least one geometry library.

In an example, the method comprises: for each pixel of the depth map: determining whether the depth value of the pixel indicates a black or a white colour; and based on the determining, i) looping to the next pixel when it is determined that the depth value indicates a white pixel, and ii) discarding geometry information associated with the pixel and looping to the next pixel when it is determined that the depth value indicates a black pixel, wherein, for the received depth map, an indicated white pixel indicates no update for that pixel, and an indicated black pixel indicates a non-valid depth.

In an example, the information related to the depth map comprises: a compressed depth map, wherein the data within the depth map comprises red, green, blue colour information.

In an example, the method comprises: performing a data decompression of the received compressed depth map; and in response to the decompression, determining depth values of the depth map by converting colour data to grayscale data.

In an example, the method is performed by the device.

In an example, the device is one of: a client computing device, a mobile device, a user equipment, a tablet computer, a personal computer.

According to an aspect, there is provided a non-transitory computer readable medium comprising program instructions, that, when executed by an apparatus, cause the apparatus to perform: receiving, from a device, at least one parameter associated with the device, wherein the at least one parameter is for an environment viewable by the device; generating a depth map associated with the environment, wherein the depth map comprises a plurality of pixels; for a pixel of the depth map: determining a depth value for the pixel using: i) the at least one parameter, and ii) at least one geometry library comprising geometry information about the environment; storing the determined depth value of the pixel in the depth map; and providing, to the device via a network, information related to the depth map comprising the determined depth value.

According to an aspect, there is provided a non-transitory computer readable medium comprising program instructions, that, when executed by an apparatus, cause the apparatus to perform: providing, to a computing entity, at least one parameter associated with a device, wherein the at least one parameter is for an environment viewable by the device; receiving, from the computing entity via a network, information related to a depth map comprising at least one depth value, wherein the depth map is associated with the environment, and wherein the depth map comprises a plurality of pixels; for a pixel of the depth map: determining whether a depth value of the pixel is the same as a stored pixel at the device using i) the at least one parameter, and ii) at least one geometry library comprising geometry information about the environment; based on the determining, updating information stored in the at least one geometry library; and rendering an image for display using the i) the at least one parameter, and ii) the at least one geometry library.

According to an aspect, there is provided a computer program comprising instructions, which when executed by an apparatus, cause the apparatus to perform: receiving, from a device, at least one parameter associated with the device, wherein the at least one parameter is for an environment viewable by the device; generating a depth map associated with the environment, wherein the depth map comprises a plurality of pixels; for a pixel of the depth map: determining a depth value for the pixel using: i) the at least one parameter, and ii) at least one geometry library comprising geometry information about the environment; storing the determined depth value of the pixel in the depth map; and providing, to the device via a network, information related to the depth map comprising the determined depth value.

According to an aspect, there is provided a computer program comprising instructions, which when executed by an apparatus, cause the apparatus to perform: providing, to a computing entity, at least one parameter associated with a device, wherein the at least one parameter is for an environment viewable by the device; receiving, from the computing entity via a network, information related to a depth map comprising at least one depth value, wherein the depth map is associated with the environment, and wherein the depth map comprises a plurality of pixels; for a pixel of the depth map: determining whether a depth value of the pixel is the same as a stored pixel at the device using i) the at least one parameter, and ii) at least one geometry library comprising geometry information about the environment; based on the determining, updating information stored in the at least one geometry library; and rendering an image for display using the i) the at least one parameter, and ii) the at least one geometry library.

An electronic device may comprise apparatus as described herein.

In the above, various aspects have been described. It should be appreciated that further aspects may be provided by the combination of any two or more of the various aspects described above.

LIST OF ABBREVIATIONS

AN: Access Network
BS: Base Station
HW: Hardware
JPEG: Joint Photographic Experts Group
MBPS: Megabytes Per Second
MPEG: Moving Pictures Experts Group
NW: Network
PSNR: Peak Signal-to-Noise Ratio
RGB: Red, green blue
SW: Software
UE: User Equipment
2D: Two-Dimensional
3D: Three-Dimensional
4G: $4^{th}$ Generation
5G: $5^{th}$ Generation

DESCRIPTION OF FIGURES

Embodiments will now be described, by way of example only, with reference to the accompanying Figures in which:

FIG. 6 shows an example method flow performed by an apparatus;

FIG. 7 shows an example method flow performed by a further apparatus; and

FIG. 8 shows a schematic representation of non-volatile memory media storing instructions and/or parameters which when executed by a processor allow the processor to perform one or more of the steps of the methods of FIG. 6 or FIG. 7.

DETAILED DESCRIPTION

Before explaining in detail some examples of the present disclosure, certain general principles of a communication system with communication devices are briefly explained with reference to FIG. 1 to assist in understanding the technology underlying the described examples.

A system 100 is provided which comprises a server device 102, and four client devices (104a-d). In this example there are four client devices (104a-d), but a system may comprise any number of client devices. Examples of client devices includes, a mobile device, a user equipment, a personal computer, a laptop, etc.

The client devices (104a-d) may be able to communicate with the server (102) using a wired connection, a wireless connection, or both. The connection between the client devices (104a-d) and the server (102) is indicated in FIG. 1 with solid lines.

In the communication system 100, client devices may be provided with wireless access to a network via at least one base station (not shown), or similar wireless transmitting and/or receiving node or point (not shown). In this example, the client devices (104a-d) are connected to the server (102) via a cellular connection. Alternatively, the client devices (104a-d) may be connected via a local area network connection, or any other suitable type of connection.

Figure 1:
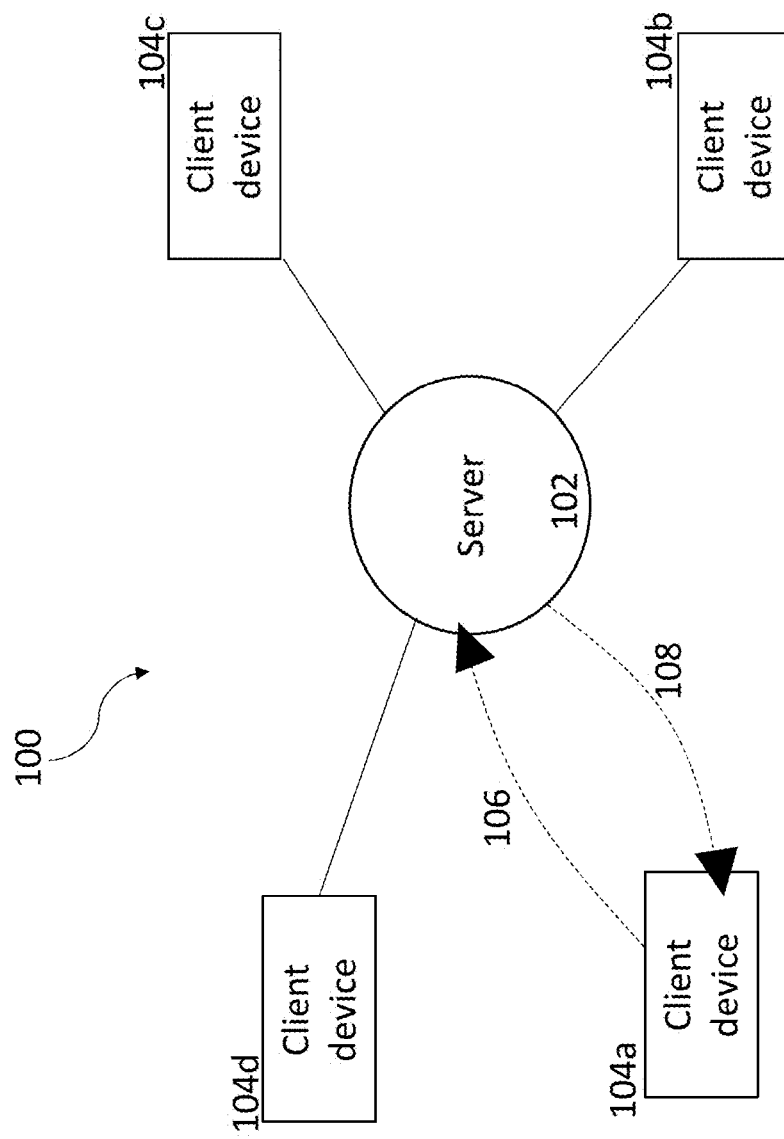
FIG. 1 shows a schematic representation of a communication network.

In FIG. 1, a first client device (104a) provides a client request (106) to the server (102). The first client device (104a) may be requesting data from the server or may be requesting to establish a connection with the server, for example.

In response to the client request (106), the server provides a server response (108) back to the first client device (102a). For example, if the request (106) was a request for data stored at the server (102), then the server (102) responds (108) with the requested data.

One or more of the following examples are related to video data and/or image data, being transmitted over one or more networks. Even though some of the examples are related to image/video data, the mechanisms described are equally applicable to other data types.

Transmitting and/or streaming of video/image data over the internet now makes up a large percentage of all traffic on the internet. Video data may be two-dimensional (2D), and in some cases, three-dimensional (3D). 3D video comprises additional information as to the depth within the frames of the video. A depth map represents a frame or an image that shows distance information compared to a reference point. A depth map may be thought of as a map of spatial elements. The reference point may be a camera (which may be real or virtual). This depth information thus shows the relationship between object surfaces and a viewpoint. Depth maps are often used in 3D computer graphics and computer vision, for applications such as, for example, gaming, and design. End users may wish to view a scene or environment in 3D. Using suitable displays and software, end users can 'move' through a scene or environment using depth information, such that the same scene or environment can be viewed from multiple different angles.

Depth maps have a number of useful applications including, simulating the effect of uniformly dense semi-transparent media within a scene, z-buffering and z-culling (techniques which can be used to make the rendering of 3D scenes more efficient), identifying objects hidden from view and which may therefore be ignored for some rendering purposes (which is important in real time applications like gaming), and in computer vision, allowing 3D images to be processed by 2D image tools.

Figure 2A:
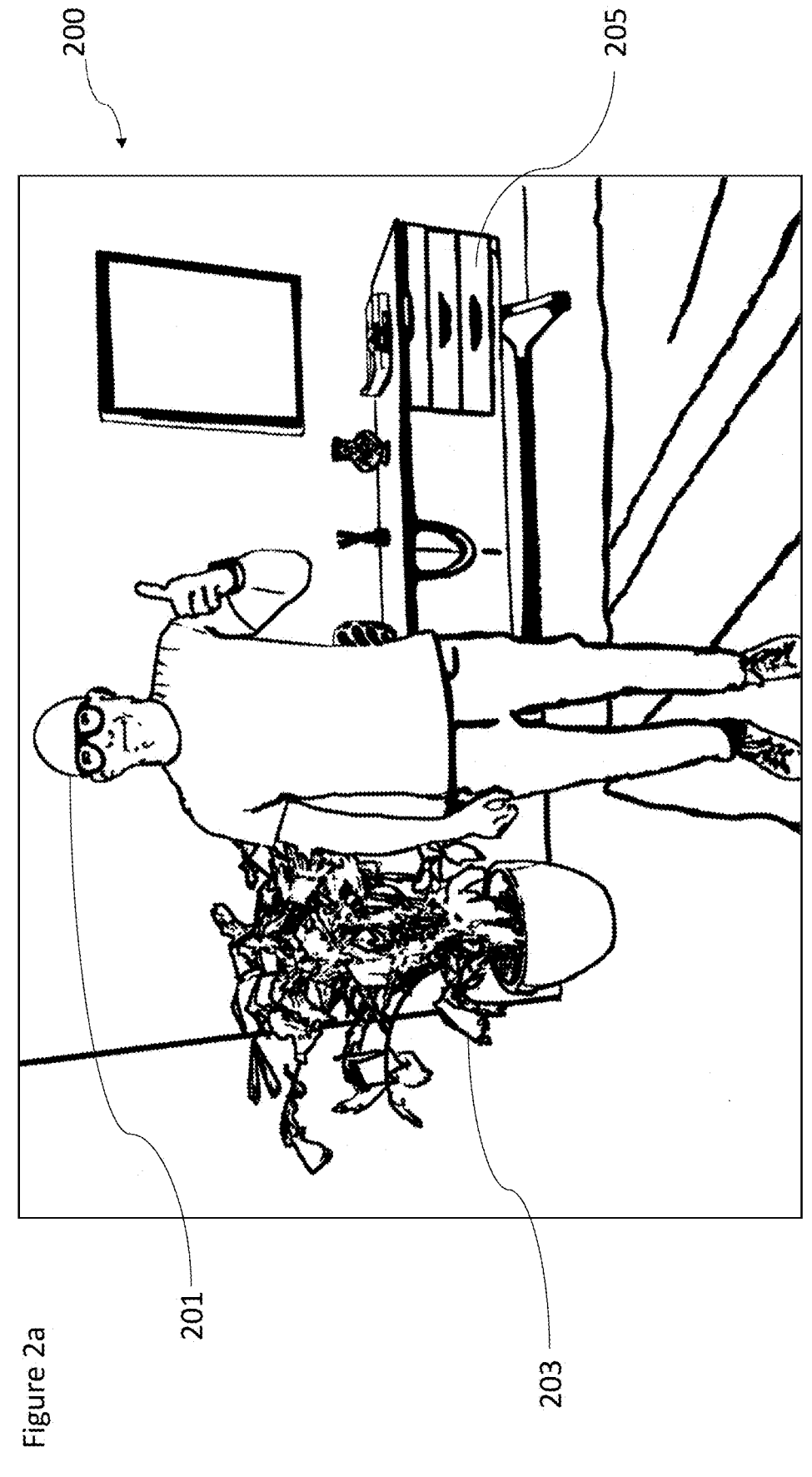
FIG. 2a shows a schematic representation of an environment illustrated as a line drawing.

FIG. 2a shows a schematic representation of an environment illustrated as a line drawing. The environment may be real, or virtual, in some examples. For example, when the environment is real, the image may be generated through a scan of the environment using one or more cameras. For example, when the environment is virtual, the image may be generated using suitable computer software.

A scan of the environment, such as the environment of FIG. 2a, may gather 3D information of the environment. Using the image data and depth data a virtual representation of the environment can be generated. In the example of FIG. 2a, a front-view of the person is shown. However, using the image and depth data, an end user may be able to view a side-profile of the person in the environment.

FIG. 2a shows an image of the environment 200. The environment 200 comprises a person 201, a plant 203, and a desk 205. The image is illustrated as a line drawing, in this example. In other examples, the same image/environment may be represented as an RGB image, photograph, etc.

This image of the environment 200 in this line drawing does not comprise information as to the depth of the person 201, the plant 203, and the desk 205 from a 'camera' or 'viewpoint'. This line drawing is said to be a 2D image.

The line drawing of FIG. 2a may be used as a reference or model to derive a depth map of the environment. This is shown in FIG. 2b.

Figure 2B:
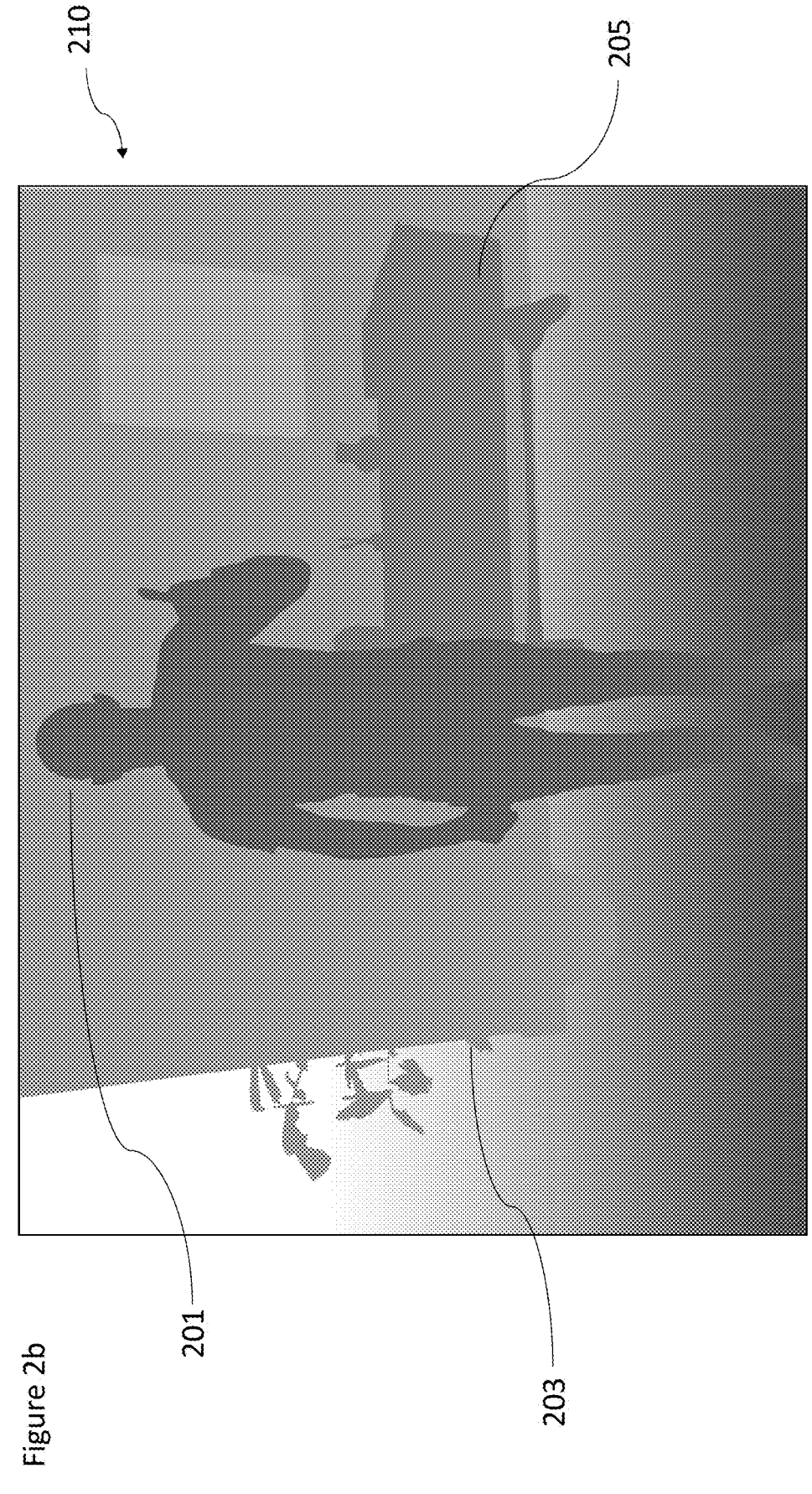
FIG. 2b shows a schematic representation of the line drawing of FIG. 2a as a depth map.

FIG. 2b shows a schematic representation of the line drawing of FIG. 2a as a depth map.

FIG. 2b shows the environment 200 of FIG. 2a with the person 201, the plant 203, and the desk 205, as a depth map 210. In the depth map 210, each pixel of the depth map shows a distance to a 'camera' or 'viewpoint'. In this example, nearer the 'camera' or 'viewpoint' is shown as darker (i.e. closer to black). In other examples, a depth map may show nearer the 'camera' or 'viewpoint' as lighter (i.e. closer to white).

A spatial analysis of the environment, image, frame may be performed in order to determine and generate a depth map, such as the depth map 210 of FIG. 2b. As previously discussed, a depth map represents an image that shows distance information compared to a reference point, such as a 'camera' or 'viewpoint'.

A depth map may have a threshold nearest distance, and a threshold further distance to the 'camera' or 'viewpoint'. For example, the threshold nearest distance is 50 centimetres (cm), and the threshold further distance is 1000 cm. This would mean that an object surface determined to be between 0 and 50 cm from the 'camera' or 'viewpoint' would be shown as a black colour (when darker means nearer). An object surface determined to be 1000 cm or further from the 'camera' or 'viewpoint' would be shown as a white colour (when darker means nearer). Object surfaces between 50 cm and 1000 cm from the 'camera' or 'viewpoint' would be a gradient between black and white dependent on the distance from the 'camera' or 'viewpoint'. It should be understood that the numbers used above are an example only to aid in the understanding.

In some examples, depth maps, such as the depth map 210 of a FIG. 2b, may be generated by a computing device, or the like, using image data, geometry information, line drawings such as the one shown in FIG. 2a. In other examples, a computing device, or the like, may generate the depth map 210 using a plurality of photographs or video frames. The computing device may generate or determine the depth map 210 using a technique such as ray-tracing. Ray tracing is a method which casts a separate (light) ray from a viewpoint through each pixel on the viewing plane. For each ray the nearest intersection with an object determines the visible surfaces. In other examples, other suitable techniques are used.

The depth map 210 may be considered to be an array of numbers, wherein each pixel of the depth map 210 is a cell of the array. The pixels in the array may comprise a depth/distance value for that pixel, for the image/environment being mapped. For example, the value may range from 0 to 1. '0' may represent the colour white, and '1' may represent the colour black. In other examples, '1' may represent the colour white, and '0' may represent the colour black. When generating the depth map 210 a depth/distance value for each pixel may be determined, with reference to the 'camera' or 'viewpoint'. The determined depth/distance value may then be stored in the depth map 210.

One or more of the following examples may be related to the generation of depth maps and the transmission of said depth maps over a network. As discussed above, the transmission of video and/or image data over network uses a lot of network bandwidth. One or more or the following examples aims to address this problem, among others.

Figure 3:
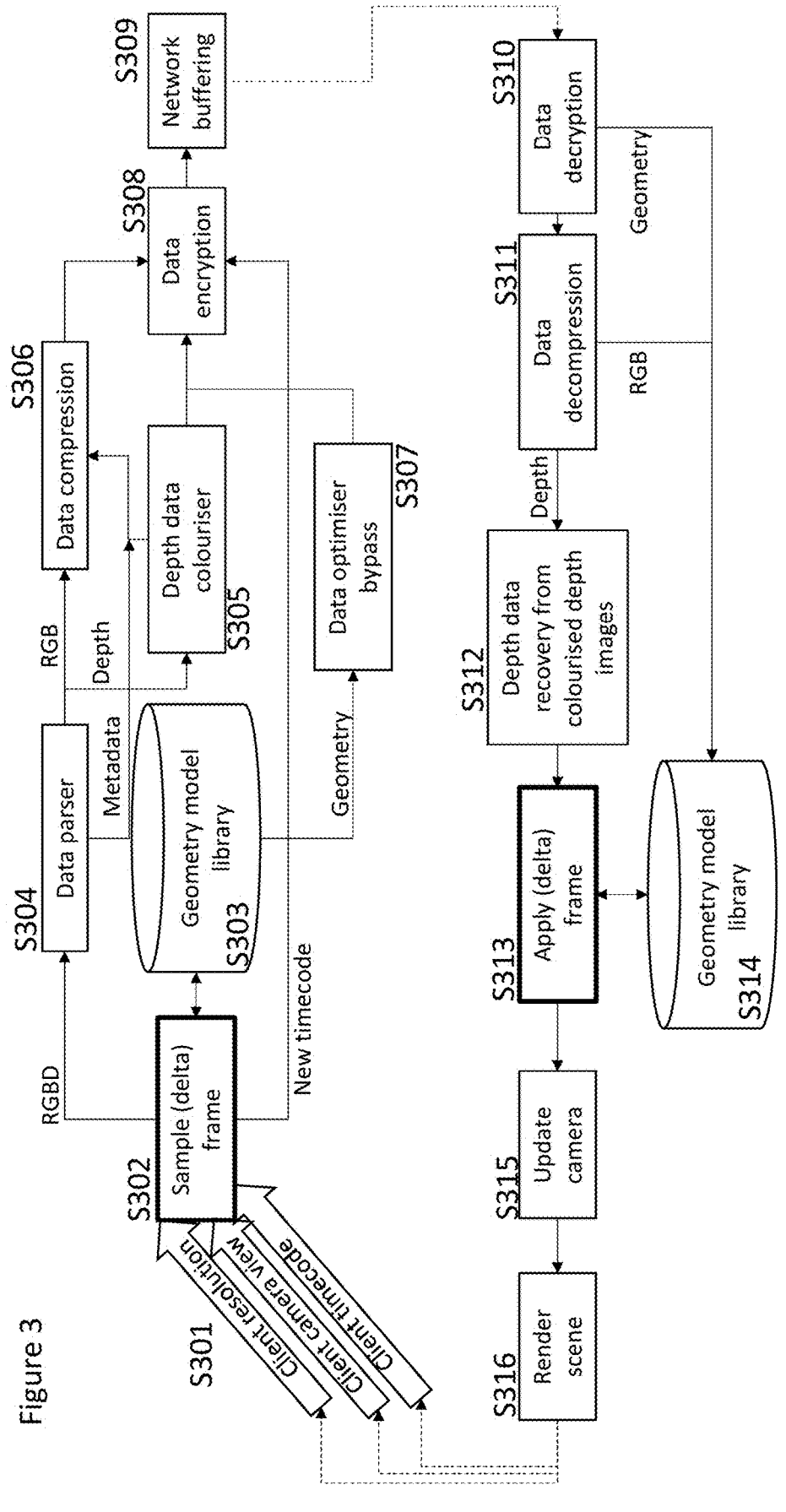
FIG. 3 shows a flow diagram of steps performed at a server and a client device that are in communication with each other.

FIG. 3 shows a flow diagram of steps performed at a server and a client device that are in communication with each other.

At S301, a server receives parameters from a client device. The client device may be referred to as a 'device' in some examples. The parameters may be for, or associated with, an environment that is viewable by the client device.

In this example, the parameters comprise a client resolution, a client camera view, and a client timecode, associated with the client device. The client resolution indicates to the server which resolution the client is currently using/viewing. The client camera view indicates to the server a view of the 'camera' that the client is viewing of the environment. Said another way, the camera view indicates which angle, and which part/section of the environment is currently being viewed by the client device. The client timecode provides a reference time, or timestamp, that the server may use to synchronise with the client device. In other examples, other application specific parameters are provided to the server. It should be understood that in other examples, one or more of the example parameters listed above may not be provided to the server. It should be understood that in other examples, further parameters may be provided to the server. The provision of the parameters to the server from the client device allows a feedback loop between the client device and the server.

In this context, the environment is a visual environment. For example, the environment may be an area of land, a room, a building, an object, a country, a game environment, etc.

At S302, the server uses the received parameter(s) to process a frame of the environment for the client device. In this context, a frame refers to an image frame, or video frame.

The frame of the environment may be a section or part of the environment. For example, if the environment is a building, then a frame for the environment may be a view within a room of the building. In other examples, the frame being processed/viewing is of the whole environment. It should be understood that these are examples only.

When the frame to be processed for the client device is the first frame provided, every pixel in the frame is processed and provided by the server. When it the first frame, it may be assumed that the client device does not have any stored information associated with the environment. Once the first frame has been provided, for subsequent frames the server determines a difference (also referred to as a delta) between the previously processed frames and the current frame. For example, if the sequence of frames provided to the client device is broken/fails, then the client may request the environment (for the given camera view) once and then deltas thereafter. This will be described in more detail below. The steps performed by the server in S302 are described in FIGS. 4a and 4b.

At S303, the server communicates with a geometry model library of the server. The geometry model library comprises information related to the environment.

The geometry model may be considered to be a collection of 3D primitives. For example, a collection of 3D pixels which may be found/described in a world space. World space is a coordinate system for an entire scene. An origin is at the center of the scene.

In examples, the geometry model library of the server comprises a representation of the whole environment. The representation may be a 3D representation. The environment may have been scanned in full and stored in the geometry model library. In this way, the information about the environment may be stored at a high resolution and a high scale. The geometry model library may be sampled to extract a relevant section (frame) of the environment, and return it to the client. For example, the sampling may return depth maps for given client camera views. This will be described in more detail in the following steps.

The geometry library of the server may be located at the server, and stored on the server. The geometry model library may be located on an external storage (accessible by the server), or built in run-time by other services/systems not shown in FIG. 3.

The server uses the geometry model library when processing the frame for the environment.

From S302, the server outputs/returns an image frame for the environment. The image frame may comprise red, green, blue (RGB) information. A depth frame (or depth map) for the environment is output/returned. A timecode is also determined and output/returned by the server.

At S304, a data parsing means (e.g. a data parser) of the server receives the image frame and the depth frame. The depth frame may comprise grayscale data. The data parser processes the information of the image frame and the depth frame to provide RGB data, depth data and metadata. Said another way, the data parser converts the format of the received frame data to the three separate formats (i.e. RGB, depth, and metadata).

For example, the RGB data may comprise RGB video streams, with the 'traditional' light spectrum data from image cameras. For example, the depth data may comprise a depth map, with an image channel with information relating to the distance of surfaces or objects to a viewpoint. For example, the metadata may comprise arbitrary text/ binary data, with metadata to quantize and/or contextualize other data sources.

At S305, the depth data from the data parser is provided to a depth data colourising means (e.g. a depth data colouriser) of the server. The depth data colouriser colorises the depth image. Colourising a grayscale image, such as a depth frame, may comprise assigning colours to the levels of grayscale. In this way, depth images can subsequently be treated as a 'normal' RGB images. An RGB image may be more easily compressed, stored, and transmitted using widely available hardware and software tools.

At S306, a data compressing means (e.g. data compressor) of the server receives at least one of: RGB data, metadata, and (colourised) depth data, from the data parser (S304). The received depth data being provided via the depth data colourising means (S305). The data compressing means compresses the received data to use fewer bits than the original representation. In some examples, the compression is a lossless compression. For example, image compression algorithms such as for example, joint photographic experts group (JPEG), moving pictures experts group (MPEG), H.264, VP8 may be applied by the data compressing means At S307, geometry from the geometry model library is provided to a data optimiser bypass. The data optimiser bypass bypasses the processing steps of S304 to S306. This may occur in some examples. For example, when the available network bandwidth is high, and no compression is needed. In this case, the optimization steps above are not performed and the geometry data is sent to the client device directly (after encryption and buffering). The geometry may be a collection of 3D primitives, for example a dense point cloud, meshes as connected triangles or quads, etc.

At S308, a data encrypting means of the server receives at least one of: the compressed data from the data compressing means, the output from the depth data colourising means, and the output from the data optimiser bypass. The data encrypting means may also receive the timecode from S302, to be encrypted. The data encrypting means encrypts the received data in any suitable manner. For example, the data may be encrypted using software such as Cereal (registered trademark (™)).

At S309, the output from the data encrypting means (i.e. encrypted data) is provided to a network buffering means of the server. The network buffering means may buffer the encrypted data in any suitable manner. For example, the encrypted data may be buffered using SLikeNet (registered trademark (™)), or EOS™.

The output from the network buffering means is then provided, via a network, to a client device. The output may be the encrypted data, processed by the server in steps S302 to S309. The output may be sent to the client device via a wired network, a wireless network, or any suitable network.

At S310, a data decrypting means of the client device receives the output from the server, via the network. The data decrypting means may receive the encrypted data, processed by the server. In examples when S309 is not performed, step S310 may also be excluded.

The data decrypting means decrypts the data in any suitable manner. For example, the data may be decrypted using Cereal.

At S311, the decrypted data is a received at a data decompressing means of client device. The data decompressing means decompresses the decrypted data. In examples when S308 is not performed, step S311 may also be excluded.

At 312, a depth data recovery means receives the (colourised) depth data that is output from the data decompressing means. The received (colourised) depth data has been decrypted and decompressed at this stage. The depth data recovery means converts the colourised depth data back to a grayscale form. This step may be seen as the opposite to the processing performed in S305. In examples when S305 is not performed, step S312 may also be excluded.

At S313, the client device applies the frame using a geometry model library (S314) of the client device. The geometry model library comprises geometry information for the environment. Information associated with the environment is stored in the geometry model as the client device receives more information/frames from the server. The geometry model library may 'build-up' the environment the more frames are received from the server.

The geometry model library may receive geometry data from the data decrypting means from S310. The geometry model library may receive RGB data from the data decompressing means from S311. The geometry model library may use the RGB data and geometry data to update, or add to the information stored in the geometry model library for the environment.

The geometry library of the server (S303) and the geometry library of the client device (S314) are different. The geometry library of the server (S303) is accessible by the server. The geometry library of the client device (S314) is accessible by the client device. For example, the geometry library of the server (S303) may be provided by a memory located in, or accessible by, the server. For example, the geometry library of the client device (S314) may be provided by a memory located in, or accessible by, the client device.

For example, the information/data of the environment stored in the library of the server may be greater (in size) than the information/data stored in the library of the client device. As the client device receives more frame data from the server, the client device can increase the amount of information about the environment to be stored in the geometry model library at the client device. Said another way, for example, if the client camera view setting is panning across the environment, then the information of the environment stored in the geometry model library of the client device will be increased as each frame is processed by the server, and provided to the client device. In this way, the server does not the send the 'whole' environment model in the highest resolution to the client device, in one instance. Instead, by sending processed frames over a certain length of running time to the client device, the client device may 'build up' a version/copy of the original server model. The model built up at the client may have a smaller scale and/or resolution than the model at the geometry model library of the server.

The application of the frame of S313 is described in more detail in FIG. 5 below.

At S315, once the frame has been applied at the client device, the camera/view of the client device may be updated. In some examples, after an iteration (i.e. steps S301 to S314) the camera view of the client device may not change. When there is an update, the updating of the camera/view means that a user of the client device is moving a camera view of the environment. For example, to view a different portion of the environment, or a different angle.

At S316, the client device renders an image according to the camera/view for viewing. The image showing at least part of the environment. The client device may then display the rendered image of the frame, for viewing. In some examples, the image is a 3D image. In some examples, the client device uses the received geometry information (from S310), the RBG information (from S311), and the depth frame information (from S312) in order to render the 3D image.

Transmitting video data alongside further information such as depth information, metadata and timecode information may use a lot of network resources. The size of this data may lead to long latency delays. These latency delays often lead to bottlenecks in the network, and at the client device. Often, requested data from a client device cannot be processed and provided to the client device in so-called 'real time'. This may lead to a reduced user experience, due to effects such as lagging, or stuttering of the frames.

Rather than using a traditional methods of streaming 3D data over the network, such as point clouds, meshes, textures etc, FIG. 3 shows that an initial processed frame is provided to the client device, and following this, frame information indicating a difference/delta is provided. The server can build up a 'cache', which indicates which pixel data the server has already provided to the client device. In this way, the server does not send the same pixel data twice. This difference/delta information being provided may be substantially smaller in size (i.e. in bytes) than providing the full frame information. Reducing the size (in bytes) of the transmission from the server to the client device leads to a reduction in latency. In some scenarios, this allows a real time rendering of the frame at the client device. The frame may be updated and rendered, in real time, as the client camera view changes at the client device.

Through the data packaging, the server may be able to efficiently transfer lossless data from the server to the client device(s) in a highly optimized manner with little to no drop in quality, regardless of network format. For example, 3D depth images with 16-bit precision may be compressed using standard codecs (lossless and lossy), with the potential for 80× compression rate.

For example, from an Intel Realsense™ camera for lossless transmission of one frame capture, the size of the original frame may be 1280×720 (32 bit)×2, which is an uncompressed 7,372,800 bytes. This can then be compressed to 114,688 bytes. With 30 fps, one second of data is equal to 3 Mb (with an equivalent data transmission speed: 24 Mbps). Utilising at a 100 Mbps (4G) network the system of FIG. 3 can accommodate up to four simultaneously streaming cameras at 30 fps. With a linear extrapolation of a local network with 1 Gbps speeds, the system of FIG. 3 could stream up to forty cameras simultaneously, at a 720p resolution.

It should be understood that, in other examples, the server described above may be replaced with another suitable device such as, for example, a cloud device, a computer, a network device, a (communications) bus. Examples of a client device include a mobile phone/device, a computer, a user equipment, a terminal.

It should be understood that one or more of the steps of FIG. 3 may not be performed in some examples, or may be performed in a different order.

Figure 4A:
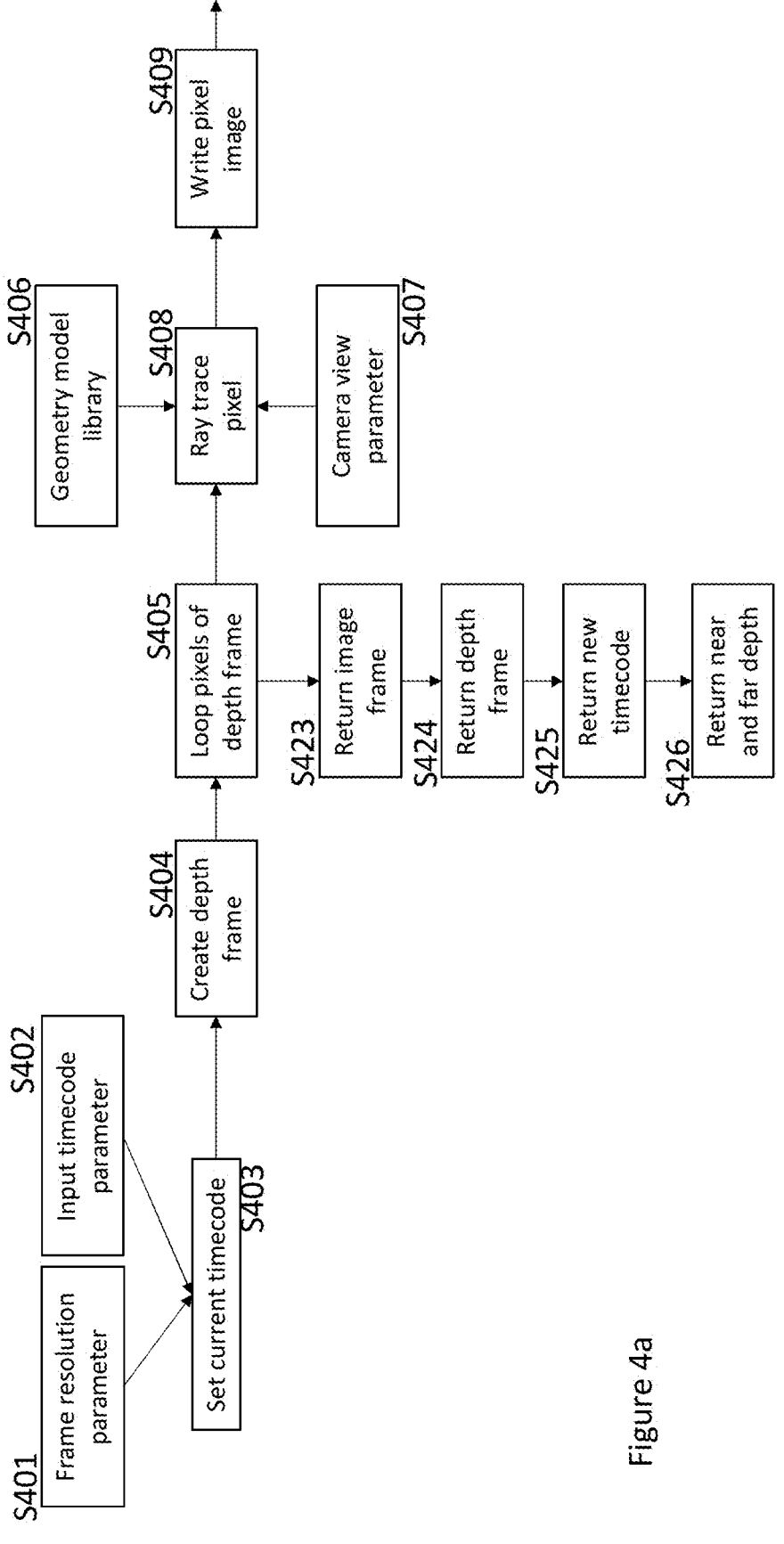
FIGS. 4a and 4b show flow diagrams of steps performed by a server.
Figure 4B:
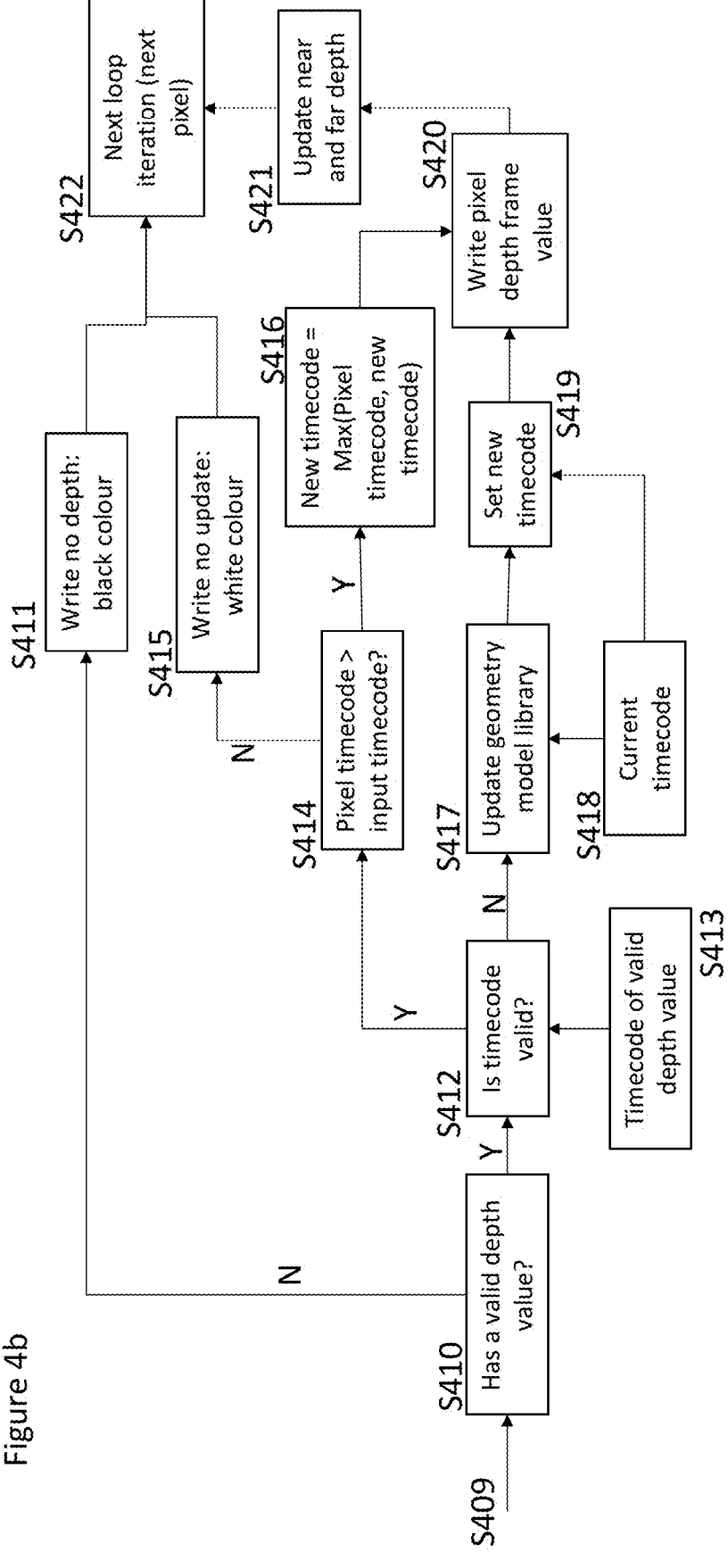

FIGS. 4a and 4b show a flow diagram of steps performed by a server. In this example, the steps are performed by a server. In other examples, the same steps may be performed by another apparatus, such as for example, a communication device, or a computing device.

At S401, a frame resolution parameter is provided. The frame resolution parameter may be received by the server from a client device. The frame resolution parameter indicates a current resolution that is being used by the client device.

At S402, an input timecode parameter is provided. The input timecode parameter may be received at the server from the client device. The input timecode may be a reference time, or timestamp, used by the client device. The input timecode may be used to enable both the client device and server to operate with common timing. In the following, a timecode may be used to determine a 'history' of previous data that has been provided to the client device. For example, for a first frame the input timecode parameter may be null, or not provided. For subsequent frames, the input timecode parameter may indicate a previous timecode indicating the last received update from the server at the client device. The server may use the input timecode parameters from the client to determine which data has been previously transmitted, and which data has not.

At S403, the server sets a new timecode. The server may use at least one of the frame resolution parameter, and the input timecode parameter, to set the new timecode. The new timecode will be referred to as the 'current timecode' herein. The new timecode may be reference timing system for the following operations.

At S404, the server creates/generates a depth frame. The depth frame may also be referred to as a depth map, or depth map for a frame. It should be understood that these terms can be used interchangeably. The server uses the frame resolution parameter to generate the depth frame. For example, the depth frame has the same resolution (i.e. the same number of pixels) as the resolution indicated in the frame resolution parameter. The created/generated depth frame is empty following its creation. Said another way, initially, there is no data comprised within the depth frame.

At S405, an iteration is started whereby, for each pixel of the depth frame, the following operations are performed.

At S406, a geometry model library is provided. It is assumed that the server has access to the content of the geometry model library. The geometry model library comprises geometry information for an environment. The geometry may be considered to be a collection of 3D primitives. For example a dense point cloud, meshes as connected triangles or quads, etc. For example, the environment may be a building, a park, a town, a room, etc.

In some examples, there are a plurality of geometry model libraries. The geometry information may be shared across the plurality of geometry model libraries.

At S407, a camera view parameter is provided. The camera view parameter may be received by the server from the client device. The camera view parameter may indicate a view of the client device of the environment. For example, when the environment is a building, the camera view parameter may indicate a camera view of the client device viewing a front door of the building.

At S408, for the current pixel of the depth frame being processed, a depth value is determined for the pixel. The determination may comprise determining how far the (visible) pixel is from the 'camera'. The depth value may be considered to be a distance between i) a surface in the environment, and ii) a viewpoint, for the current pixel. In some examples, a ray tracing of the pixel is performed using the geometry model library, and the camera view parameter.

At S409, in response to the completed determination, RGB information of the pixel is written to/stored in an image frame. The image frame has the same resolution (i.e. number of pixels) as the depth frame.

At S410, the server determines whether the pixel has a valid depth value. The determination is based on the output of the determination performed in S408. In examples, when each pixel is ray traced, a result of the ray tracing may be valid, or may be a miss (also known as a void) which means that no geometry was found. For example, it may be that objects are too far from the camera, or depth data is deemed as not accurate enough. In this case, the ray tracing of the pixel may return a miss/void output, meaning that the pixel is not valid.

At S411, when it is determined that the pixel does not have a valid depth value, the pixel in the depth frame is stored as "no depth". "No depth" in the depth frame may be indicated as a black colour. The black colour may be represented as a value of "0" in the depth frame. Said another way, when the pixel does not have a valid depth (i.e. the 'no' response), this means that ray tracing has not hit any visible geometry for that pixel and the depth frame pixel will have black colour.

In other examples, the black colour is represented by a value of "1", or another suitable value. Following this, the operation loops to process the next pixel (S422).

At S412, when it is determined that the pixel does have a valid depth value, it is further determined whether a timecode of the pixel is valid. Every ray-traced pixel with a valid depth returns its associated timecode (S413). The timecode indicating when the persistent geometry was updated. In this way, the timecode is associated with the geometry model, and referred to as a geometry model timecode herein.

The geometry model timecode is used to keep track of which depth data is new, or old, for every depth frame, for the client device.

Said another way, for the client device, a so-called 'snapshot' of the geometry model of the environment is created (i.e. a cache), by tracking all of the pixels that are returned to the client. In S412, a check is performed to determine if the current pixel has ever been previously returned to the client device having the geometry model timecode (S413). If it has not, then the 'cache' is updated and a new timecode is updated.

At S414, when it is determined that the associated timecode of the pixel is valid, it is further determined whether the timecode of the pixel is greater than the input timecode parameter.

At S415, when the timecode of the pixel is less than (i.e. earlier in time) the geometry model timecode, then the pixel in the depth frame is stored as "no update". The "no update" indicates that there has been no change in the pixel since a previous processing of that pixel. "No update" in the depth frame may be indicated as a white colour. The white colour may be represented as a value of "1" in the depth frame.

In other examples, the white colour is represented by a value of "0", or another suitable value. Following this, the operation loops to process the next pixel (S422).

For example, the depth values may range from 0 to 1. A depth value of '0' indicating invalid/no depth, and a depth value of '1' indicating no update in the depth value (i.e. this depth value for the pixel has previously been provided. Depth values between '0' and '1', i.e. 0.01 to 0.99 giving a measured/determined depth value for that pixel. For example, '0.01' being the closest possible distance to the viewpoint, and '0.99' being the further possible from the viewpoint. It should be understood that these numbers are given as an example only to aid in the understanding.

At S416, when the timecode of the pixel is greater than the input timecode, a new timecode is determined. The new timecode of S416 is referred to as the 'second timecode' herein. The second timecode is set to the greater of: i) the pixel timecode, and ii) the current timecode.

At S417, when the timecode of the pixel has been determined to be invalid, the geometry model library for the environment is updated. An invalid timecode means that the pixel from the geometry model is different compared to the last time it was updated. Said another way, the pixel is new or modified data. For example, the camera view of the client device has moved to a new area, which has not previously been processed for the client device.

At S419, a new timecode is set using the current timecode (S418). The new timecode will be set to match the current timecode (i.e. to be the same as the current timecode).

At S420, once the second timecode has been determined or the new timecode has been set, the determined value of depth (from S408) of the pixel is written to the depth frame.

At S421, a near depth threshold is provided and a far depth threshold is provided.

The near depth threshold will identify a distance value whereby anything within the frame at that distance from the camera view parameter, or less, is capped within the depth map. For example, if the near depth threshold is 0.5 metres, then any object at 0.5 m or less from the view of the camera will be indicated as the same distance in the depth frame.

The far depth threshold will identify a distance value whereby anything within the frame at that distance from the camera view parameter, or more, is capped within the depth map. For example, if the far depth threshold is 10 metres, then any object at 10 m or more from the view of the camera will be indicated as the same distance in the depth frame.

In this way, for every frame effective depth range is calculated which is written to the depth frame. This may be a metadata, stored with each frame, to be used in the subsequent steps for optimizing depth compression.

The near depth threshold and the far depth threshold values are variable. The thresholds are variable in that they can be updated during the processing of the pixels in the depth frame. The depth range depends on the environment being processed/scanned. The far depth threshold may be the furthest object in the scene (e.g. a wall in the background). In other examples, if the camera view is looking into a tunnel, then the far depth may be relatively large which may affect an overall depth compression accuracy.

Following the processing of the pixel, the near and far depth thresholds are updated. Following this, the operation loops to process the next pixel (S422).

At S423, once all of the pixels of the depth frame have been processed, the image frame is returned. The image frame may be further processed, as will be described in more detail below. In some examples, the image frame is provided to the client device.

At S424, once all of the pixels of the depth frame have been processed, the depth frame is returned. The depth frame may be further processed, as will be described in more detail below. In some examples, information related to the depth frame is provided to the client device. In some examples, the depth frame is provided to the client device.

At S425, once all of the pixels of the depth frame have been processed, the new timecode (i.e. the second timecode) is returned. In some examples, the second timecode is provided to the client device.

At S426, once all of the pixels of the depth frame have been processed, the near and far depth thresholds are returned. In some examples, the near and far depth thresholds are provided to the client device.

It should be understood that blocks S423 to S426 may be performed together (i.e. the blocks may be merged together). For example, at the completion of the iterations, a list of output parameters is returned, comprising an image frame (pixels), a depth frame (pixels), a timecode, and near and far depth thresholds (metres).

Figure 5:
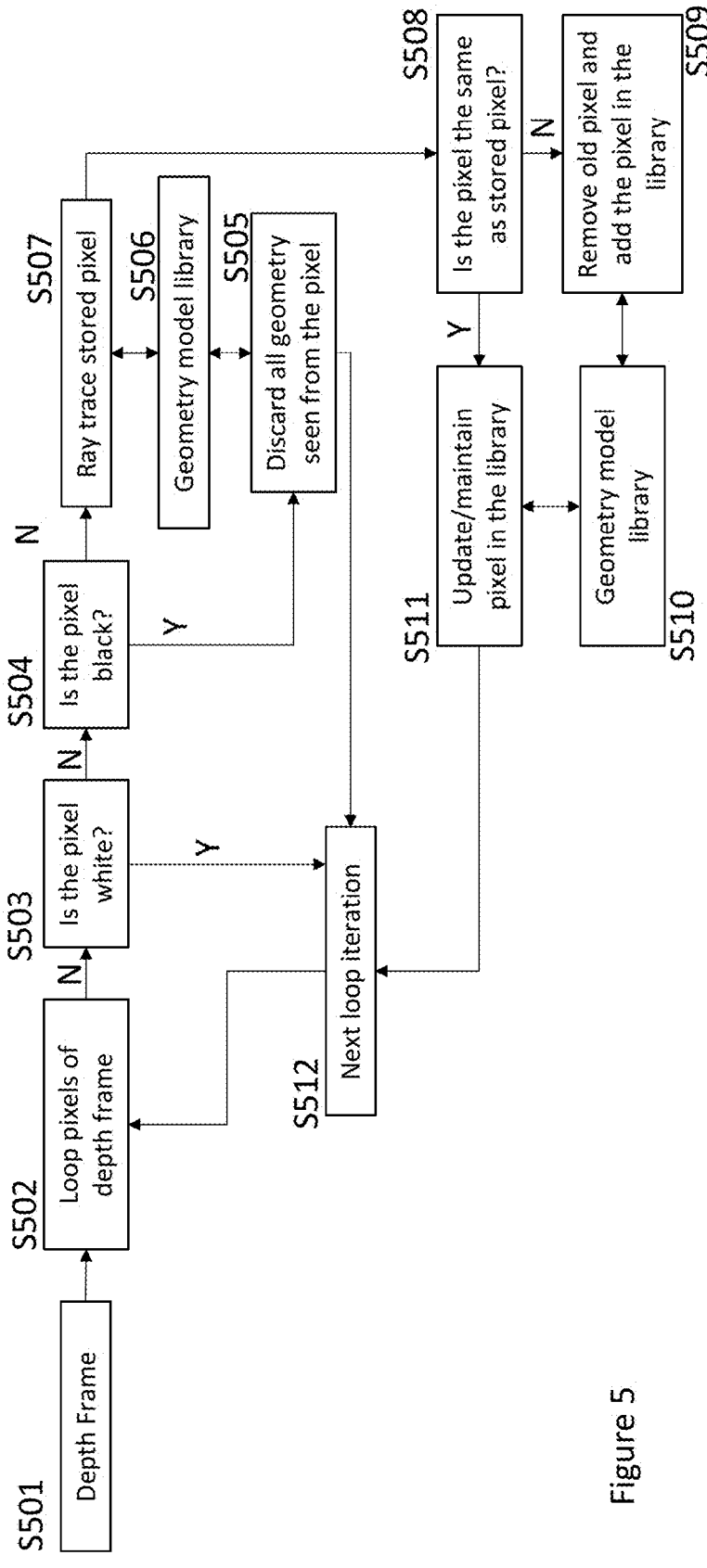
FIG. 5 shows a flow diagram of steps performed by a client device.

FIG. 5 shows a flow diagram of steps performed by a client device. In this example, the steps are performed by a client device. In other examples, the same steps may be performed by another apparatus, such as for example, a device, a user equipment, a terminal, a communication device, or any suitable computing device.

At S501, the client device receives an output from the depth data recovery means (i.e. from S312 of FIG. 3). The output from the depth data recovery means comprises depth data for the frame. The depth data may comprise a depth map/depth frame.

At S502, the client device loops through each pixel of the depth frame. Each pixel of the depth frame may be processed individually in an iterative manner.

At S503, for the pixel being processed, it is determined whether the pixel is white. A value of '1' for that pixel may indicate a white colour. The white colour of the pixel indicates that there has been no update in the depth frame, compared to a previous frame. The "no update" indicates that there has been no change in that pixel since a previous processing of that pixel. Data for that pixel will already have been stored in the geometry model library of the client device. In this way, no further processing needs to be done for that pixel, and the next pixel can be processed.

When it is determined that the pixel is white (e.g. has a value of '1'), the process will continue to the next pixel in the depth frame, for processing (S512).

At S504, when it is determined that the pixel being processed is not white, it will then be determined whether the pixel is black. A value of '0' for that pixel may indicate a black colour, i.e. invalid depth. When it is determined that the pixel does not have a valid depth value, the pixel in the depth frame is stored as "no depth".

At S505, when it is determined that the pixel is black, the stored geometry for that pixel will be deleted/discarded by the client device. The geometry is stored in the geometry model library (S506) of the client device. The pixel is discarded as the black colour indicates no depth, or an invalid depth.

Following the discarding/deletion of the geometry from the pixel, the process proceeds to the next loop iteration (S512).

When it is determined that the pixel is not black, the process proceeds to S507.

At S507, the client device starts a process to compare the received pixel of the depth frame (S501) with a respective pixel stored in the geometry model library (S510) of the client device. The client device determines a depth value for the respective pixel of the geometry model library (S510) of the client device. The client device may use the camera view parameter (that the client device provided in S301) to determine the depth value. In this way, the same 'viewpoint' is used to determine the depth value in both the server and the client device for the pixel.

In some examples, the geometry model library of the client device may have no information/data for that pixel. In some examples, the geometry model library of the client device may have different information/data for the pixel.

The client device may determine the depth value of the stored pixel in the geometry model library of the client device using ray tracing. In this way, the client device is ray tracing the client device version of the stored geometry model library, to be able to compare it with the depth value from the received depth frame/map.

An output from S507 may be a depth value of the stored pixel in the geometry model library of the client device.

At S508, it is determined whether the pixel is the same as the respective pixel that is already stored in the geometry model library of the client device. In some examples, a 'world space' is used to determine if both pixels are the same or not. World space is a coordinate system for an entire scene. An origin of the world space is at the center of the scene. When comparing the incoming (3D) pixels against the pixels previously stored in the client device version of the geometry model, the determination of whether they are the same may take place in a consistent coordinate space, for example, the world space.

At S509, when it is determined that the pixel is not the same, the 'old' pixel is removed from the geometry model library, and the pixel being processing is added into the geometry model library. The removal and the addition utilize the geometry model library (S510) of the client device.

At S511, when it is determined that the pixel is the same, the pixel is updated, or maintained, in the geometry model library according to the determined depth value of the pixel (S507). The updating utilizes the geometry model library (S510) of the client device. In some examples, the step of S511 may be omitted when the pixel being processed is the same, and the depth value is the same, as the stored pixel. This step, S511, may be skipped in some examples when the pixels are determined to be the same.

At S512, the processing loops to the next pixel of the depth frame. The steps S502 to S511 are performed for each pixel of the depth frame.

It should be understood that one or more of the steps of FIG. 5 may not be performed in some examples, or may be performed in a different order.

One or more of the examples discussed above allow a number of data streams to be provided from one location (e.g. a computing entity, server, etc) to one or more remote locations (e.g. client devices, mobile devices, etc). The data streams may comprise at least one of: depth maps (i.e. an image channel with information relating to the distance of surfaces or objects), RGB video streams (i.e. the traditional light spectrum data from image cameras), and text/binary data (e.g. metadata to quantize and/or contextualise other data sources). Through the data packaging processes discussed in the examples above, an efficient transfer of lossless data from source to client network may be achieved in a highly optimized manner with no drop in quality regardless of network format. For example, 3D depth images with 16-bit precision can be compressed using standard codecs (lossless and lossy), with the potential for 80× compression rate.

Rather than using known method of streaming 3D data over the network, such as point clouds, meshes, textures etc, one or more of the examples discussed above transmits 2D depth maps to one or more client devices.

Transmitting 3D data with further information such as depth information, metadata and timecode information often uses a lot of network resources. The size of this data being transmitted may lead to long latency delays within systems. These latency delays often lead to bottlenecks in the network, and at the client device. Often, requested data from a client device cannot be processed and provided to the client device in so-called 'real time'. This may lead to a reduced user experience, due to effects such as lagging, or stuttering of the frames.

One or more of the examples show that a computing entity, such as a server, may have access to a geometry library. The geometry library of the computing entity may comprise 3D geometry information for an environment, in the highest quality and the highest resolution. It would be inefficient to transmit all of the data comprised in the geometry library from the computing entity to one or more client devices that request said data for the environment.

Thus, instead of providing all of the data, one or more initial processed frames (e.g. depth map frame) are provided to the client device, based on parameters of the client device (e.g. camera view, resolution, etc.). In this way, only a relevant section or 'snapshot' of the environment is provided to the client device.

Following this, subsequent frames transmitted to the client device comprise only a difference/delta compared to previous frames. For example, if the camera view of the client device moves to a frame that has already been provided by the computing device, the information is not sent again.

The computing device may store a cache/memory of the information that has already been provided to the client device. In this way, the computing entity ensures that the same data is not transmitted twice, in order to save transmission resources. In some examples, a subset of the pixels of the frame will comprise information, and other pixels will be empty/free of data. The difference/delta frame being provided to the client device may therefore be substantially smaller in size (i.e. in bytes) compared to providing a frame with data in every pixel. Reducing the size (in bytes) of the transmission from the server to the client device leads to a reduction in latency. In some scenarios, this allows a real time rendering of the frame at the client device. The frame may be updated and rendered, in real time, as the client camera view changes at the client device.

Furthermore, in some examples, the depth data is colourised by a depth data colouriser. The depth data colouriser colorises the depth image. Colouring a grayscale image, such as a depth frame, may comprise assigning colours to the levels of grayscale. In this way, depth images can subsequently be treated as a 'normal' RGB images. As an RGB image may be more easily compressed, stored, and transmitted using widely available hardware and software tools when compared to grayscale images, this means that the depth map can be transmitted using fewer resources. This further reduces latency in the system.

FIG. 6 shows an example method flow performed by an apparatus. The apparatus may be comprised within a computing entity. The apparatus may be a computing entity. The apparatus may be for a computing entity. For example, the computing entity is a server, cloud device, computing cluster, etc.

In S601, the method comprises receiving, from a device, at least one parameter associated with the device, wherein the at least one parameter is for an environment viewable by the device.

In S603, the method comprises generating a depth map associated with the environment, wherein the depth map comprises a plurality of pixels.

In S605, the method comprises for a pixel of the depth map: determining a depth value for the pixel using: i) the at least one parameter, and ii) at least one geometry library comprising geometry information about the environment; and storing the determined depth value of the pixel in the depth map.

In S607, the method comprises providing, to the device via a network, information related to the depth map comprising the determined depth value.

FIG. 7 shows an example method flow performed by an apparatus. The apparatus may be comprised within a client device. The apparatus may be a client device. The apparatus may be for a client device. For example, the client device is a mobile device, a laptop, a UE, etc.

In S701 the method comprises providing, to a computing entity, at least one parameter associated with a device, wherein the at least one parameter is for an environment viewable by the device.

In S703 the method comprises receiving, from the computing entity via a network, information related to a depth map comprising at least one depth value, wherein the depth map is associated with the environment, and wherein the depth map comprises a plurality of pixels.

In S705 the method comprises for a pixel of the depth map: determining whether a depth value of the pixel is the same as a stored pixel at the device using i) the at least one parameter, and ii) at least one geometry library comprising geometry information about the environment, and based on the determining, updating information stored in the at least one geometry library.

In S707 the method comprises rendering an image for display using the i) the at least one parameter, and ii) the at least one geometry library.

FIG. 8 shows a schematic representation of non-volatile memory media 800*a* (e.g. blu-ray disk (BD), computer disc (CD) or digital versatile disc (DVD)) and 800*b* (e.g. solid state drive (SSD), universal serial bus (USB) memory stick) storing instructions and/or parameters 802 which when executed by a processor allow the processor to perform one or more of the steps of the methods of FIG. 6 or FIG. 7.

It is noted that while the above describes example embodiments, there are several variations and modifications which may be made to the disclosed solution without departing from the scope of the present invention. The examples may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The examples may be implemented by computer software stored in a memory and executable by at least one data processor of the involved entities or by hardware, or by a combination of software and hardware. The term "non-transitory", as used herein, is a limitation of the medium itself (i.e. tangible, not a signal) as opposed to a limitation on data storage persistency (e.g. RAM vs ROM). As used herein, "at least one of the following: <a list of two or more elements>" and "at least one of: <a list of two or more elements>" and similar wording, where the list of two or more elements are joined by "and", or "or", mean at least any one of the elements, or at least any two or more of the elements, or at least all of the elements. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. Alternatively, or additionally some examples may be implemented using circuitry. The circuitry may be configured to perform one or more of the functions and/or method steps previously described. That circuitry may be provided in the base station and/or in the communications device. The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising at least one processor and at least one memory storing instructions that, when executed by the at least one processor, cause the apparatus to perform:

receiving, from a device, at least one parameter associated with the device, wherein the at least one parameter is for an environment viewable by the device;

generating a depth map associated with the environment, wherein the depth map comprises a plurality of pixels;

for a pixel of the depth map:

determining a depth value for the pixel using: i) the at least one parameter and ii) at least one geometry library comprising geometry information about the environment, and storing the determined depth value of the pixel in the depth map;

providing, to the device via a network, information related to the depth map comprising the determined depth value;

receiving, from the device, at least one further parameter associated with the device, wherein the at least one further parameter is for the environment;

generating a further depth map associated with the environment, wherein the further depth map comprises a plurality of pixels;

for a pixel of the further depth map:

determining a further depth value for the pixel using: i) the at least one further parameter and ii) the at least one geometry library, comparing the further depth value for the pixel of the further depth map to the depth value of the pixel of the depth map, and when it is determined that the depth values are different, storing the further depth value of the pixel in the further depth map; and providing, to the device via the network, information related to the further depth map.

2. The apparatus according to claim 1, wherein generating a depth map comprises generating the depth map for a frame, wherein the frame is based on the received at least one parameter.

3. The apparatus according to claim 2, wherein generating the depth map comprises generating the depth map for the frame using the at least one parameter, and wherein the depth map is initially empty after generation.

4. The apparatus according to claim 2, wherein, for each pixel of the frame, determining a depth value for the pixel comprises determining whether the same determined depth value for the pixel has been previously provided to the device; and wherein storing the determined depth value of the pixel comprises:

when it is determined that the same determined depth value has not been previously provided, storing the determined depth value of the pixel in the depth map; and when it is determined that the same determined depth value has been previously provided, leaving the depth value for the pixel empty in the depth map.

5. The apparatus according to claim 2, wherein the apparatus is further caused to perform:

providing a near depth threshold value and a far depth threshold value;

for each pixel of the frame, updating at least one of the near depth threshold value and the far threshold value using the determined depth value for the pixel; and providing the near depth threshold value and the far depth threshold value to the device as metadata for the depth map.

6. The apparatus according to claim 1, wherein the determining a depth value for the pixel and storing the determined depth value of the pixel is performed for each pixel in the depth map.

7. The apparatus according to claim 1, wherein providing information related to the depth map comprises providing, to the device via a network, the depth map comprising the determined depth value.

8. The apparatus according to claim 1, wherein determining a depth value for the pixel comprises:

determining a relevant section of the environment based on the at least one parameter;

retrieving geometry information from the geometry library for the relevant section of the environment; and calculating a depth value for the pixel using the geometry information.

9. The apparatus according to claim 8, wherein calculating a depth value comprises performing a ray-tracing operation for the pixel using the geometry information to determine the depth value.

10. The apparatus according to claim 1, wherein the apparatus is further caused to perform:

before providing information related to the depth map to the device via the network, colourising each pixel of the depth map to convert grayscale to colour data; and in response to the colourising, performing a data compression of the depth map.

11. The apparatus according to claim 1, wherein the at least one parameter comprises at least one of a resolution associated with the device, a camera view associated with the device, and a timecode associated with the device.

12. The apparatus according to claim 1, wherein receiving at least one parameter comprises receiving, from a plurality of devices, a plurality of parameters, each of the devices having an associated at least one parameter.

13. The apparatus according to claim 1, wherein the apparatus is for a computing entity, the apparatus is comprised in the computing entity, or the apparatus is the computing entity.

14. An apparatus comprising at least one processor and at least one memory storing instructions that, when executed by the at least one processor, cause the apparatus to perform:

providing, to a computing entity, at least one parameter associated with a device, wherein the at least one parameter is for an environment viewable by the device;

receiving, from the computing entity via a network, information related to a depth map comprising at least one depth value, wherein the depth map is associated with the environment, and wherein the depth map comprises a plurality of pixels;

for a pixel of the depth map:

determining whether a depth value of the pixel is the same as a stored pixel at the device using i) the at least one parameter and ii) at least one geometry library comprising geometry information about the environment, and based on the determining, updating information stored in the at least one geometry library;

rendering an image for display using the i) the at least one parameter and ii) the at least one geometry library;

providing, to the computing entity, at least one further parameter associated with the device, wherein the at least one further parameter is for the environment;

receiving, from the computing entity via the network, information related to a further depth map, wherein the further depth map is associated with the environment, and wherein the further depth map comprises a plurality of pixels;

for a pixel of the further depth map:

determining whether a depth value of the pixel is the same as a stored pixel at the device using i) the at least one further parameter and ii) at least one geometry library comprising geometry information about the environment, and based on the determining, updating information stored in the at least one geometry library; and rendering an image for display using i) the at least one further parameter and ii) the at least one geometry library.

15. The apparatus according to claim 14, wherein the apparatus is further caused to perform for each pixel of the depth map:

determining whether a depth value of the pixel is the same as a stored pixel at the device using i) the at least one parameter, and ii) at least one geometry library comprising geometry information about the environment; and based on the determining, updating information stored in the at least one geometry library.

16. The apparatus according to claim 14, wherein the apparatus is further caused to perform for each pixel of the depth map:

determining whether the depth value of the pixel indicates a black or a white colour; and based on the determining, i) looping to the next pixel when it is determined that the depth value indicates a white pixel, and ii) discarding geometry information associated with the pixel and looping to the next pixel when it is determined that the depth value indicates a black pixel, wherein, for the received information related to the depth map, an indicated white pixel indicates no update for that pixel, and an indicated black pixel indicates a non-valid depth.

17. The apparatus according to claim 14, wherein the information related to the depth map comprises a compressed depth map, wherein data within the depth map comprises red, green, blue colour information.

18. The apparatus according to claim 17, wherein the apparatus is further caused to perform:

performing a data decompression of the received compressed depth map; and in response to the decompression, determining depth values of the depth map by converting colour data to grayscale data.

19. A method comprising:

receiving, from a device, at least one parameter associated with the device, wherein the at least one parameter is for an environment viewable by the device;

generating a depth map associated with the environment, wherein the depth map comprises a plurality of pixels;

for a pixel of the depth map:

determining a depth value for the pixel using: i) the at least one parameter and ii) at least one geometry library comprising geometry information about the environment, and storing the determined depth value of the pixel in the depth map;

providing, to the device via a network, information related to the depth map comprising the determined depth value;

receiving, from the device, at least one further parameter associated with the device, wherein the at least one further parameter is for the environment;

generating a further depth map associated with the environment, wherein the further depth map comprises a plurality of pixels;

for a pixel of the further depth map:

determining a further depth value for the pixel using: i) the at least one further parameter and ii) the at least one geometry library, comparing the further depth value for the pixel of the further depth map to the depth value of the pixel of the depth map, and when it is determined that the depth values are different, storing the further depth value of the pixel in the further depth map; and providing, to the device via the network, information related to the further depth map.

* * * * *